United States Patent [19]
Ozawa et al.

[11] Patent Number: 6,023,725
[45] Date of Patent: Feb. 8, 2000

[54] MULTIPLE VIDEO SERVER SYSTEM FOR TRANSMITTING DATA TO A CONSTANT BIT RATE NETWORK THROUGH A VARIABLE BIT RATE NETWORK

[75] Inventors: Masayuki Ozawa; Akihiro Okada; Mamoru Udagawa; Shuichi Hiroshima, all of Kawasaki, Japan

[73] Assignee: Fujitsu Limited, Kawasaki, Japan

[21] Appl. No.: 08/638,738

[22] Filed: Apr. 29, 1996

[30] Foreign Application Priority Data

Sep. 8, 1995 [JP] Japan ................................. 7-231000

[51] Int. Cl.[7] ............................. H04N 7/14; H04H 1/02
[52] U.S. Cl. ............................. 709/219; 348/7; 348/12; 455/5.1
[58] Field of Search ................... 395/200.47, 200.48, 395/200.49; 348/6, 7, 12, 13; 455/4.1, 4.2, 5.1, 3.1, 6.1; 709/217–219; H04N 7/10, 7/14, 7/173

[56] References Cited

U.S. PATENT DOCUMENTS

| | | |
|---|---|---|
| 5,414,455 | 5/1995 | Hooper et al. ............................. 348/7 |
| 5,586,264 | 12/1996 | Belknap et al. ...................... 348/7 X |
| 5,606,359 | 2/1997 | Youden et al. ............................. 348/7 |

*Primary Examiner*—John W. Miller
*Attorney, Agent, or Firm*—Staas & Halsey LLP

[57] ABSTRACT

A multiple video server system for transmitting data to a second network of a constant bit rate (CBR) through a first network of a variable bit rate (VBR). The server system has a server unit for transmitting data to the first network at a transmission interval (T) adapted to the constant bit rate of the second network. In the case where the constant bit rate of the second network is set to (n) [Mbps] and a transmission data amount which is transmitted at a time to the first network is set to DL, the server unit obtains the transmission interval (T) from T=DL/n and sets.

18 Claims, 16 Drawing Sheets

FIG. 13

| USER ID | USER FLAG | STREAM NAME (TITLE) |
|---|---|---|
| 0001 | 1 | st#1 |
| 0002 | 1 | st#2 |
| 0003 | 0 | |
| 0004 | 0 | |
| 0005 | 0 | |

MULTIPLE VIDEO SERVER SYSTEM FOR TRANSMITTING DATA TO A CONSTANT BIT RATE NETWORK THROUGH A VARIABLE BIT RATE NETWORK

BACKGROUND OF THE INVENTION

The invention relates to a multiple video server system in which video data digitized through a CATV network, an exclusive-use line network, or the like of a constant bit rate is transmitted to a user terminal from a video server constructed by an ATM or LAN network of a variable bit rate. More particularly, the invention relates to a multiple video server system in which an ATM network which can transfer data at a high speed at a variable bit rate is emulated to a constant bit rate and the data is transmitted.

In association with the development of the recent semiconductor technique, video and audio compressing technique such as MPEG1, MPEG2, or the like, and a network technique, a server system which corresponds to a multimedia and provides digital video data has been put into practical use as a product and its offer has been being started. Video and audio data is provided for the multimedia server system through various kinds of transmission path networks such as LAN (Local Area Network), ISDN, ATM (Asynchronous Transfer Mode), CATV, and the like.

Among such video server networks, in the case where a network on the server side is constructed by using the network of a variable bit rate (VBR), for example, the LAN network or ATM network as a nucleus and video and audio data is distributed to the user by an exclusive-use line in the outside of the server or a transmission path network of a constant bit rate (CBR) such as a CATV network, or the like, it is required that the data is converted to the data of a constant bit rate on the transmission side of the server and is transmitted to the CATV network. Therefore, it is necessary to convert the transmission data to the data of a constant bit rate in an exit portion of the network of a variable bit rate locating on the server side and to transmit to the CATV network.

In the conventional video server system, a data buffer of a large capacity is provided at an entrance of the CATV network which needs the conversion into a constant bit rate and video data is sent from the server to the data buffer through the ATM network of a variable bit rate. When the data buffer is likely to overflow, a signal to stop the data transmission is sent to the server through the ATM network. Therefore, a flow control such that the data is read out from the data buffer in accordance with a reference clock of a constant bit rate without causing an overflow of the data buffer and is transmitted to the CATV system is executed. In the video server system, on the other hand, there is a case where what is called a multi-address transmission such that the video/audio data of the same program is sent from the server to a plurality of user terminals is executed. In this case, a (1:n) communication such that there is one transmitting source and there are (n) reception destinations is executed. However, since the number of transmission data to a plurality of partners is equal to one, the flow control of the (1:1) communication cannot be performed. Therefore, it is necessary to execute a one-way communication such that the transmission according to a constant bit rate is performed on the server transmission side and no response signal is returned at the entrance of the CATV network. As a data transmission of a constant bit rate, in an ITU-T (International Union-Telecommunication Standardization Sector), an ATM forum, or the like, there has been proposed a control method whereby the contents of the transmission data are read out on a network card and recognized and transmitted in accordance with the time information written in the internal data of the transmission. According to the method of converting to the constant bit rate, it is necessary to perform the network transmission by installing an exclusive-use CPU of a high processing ability as a network card. There is, consequently, a problem such that as a present commercially available general network card, for example, an ATM card of the ATM network cannot be used. Since it is necessary to perform multiple processes to a plurality of partners, an exclusive-use CPU of a high processing ability has to be installed to the network card. There is a problem of an increase in costs.

SUMMARY OF THE INVENTION

According to the invention, a multiple video server system in which transmission data for a network of a variable bit rate is converted to a constant bit rate by using a general network card is provided.

The invention relates to a multiple video server system for transmitting data to a second network of a constant bit rate (CBR) through a first network of a variable bit rate (VBR). As such a multiple video server system, the invention is characterized by having a server unit for transmitting data to the first network at a transmission interval (T) adapted to the constant bit rate of the second network. Now assuming that the constant bit rate of the second network is set to n [Mbps] and a transmission data amount to be transmitted at a time to the first network is set to DL, the server unit obtains the transmission interval (T) by $$T=DL/n$$

and sets.

A hardware of the server unit comprises: a data storage unit for storing transmission data on a stream unit basis; a buffer memory for temporarily storing data which is transmitted from the data storage unit to a first network; a network interface for transmitting the data in the buffer memory to the first network; a timer unit for generating a transmission timing signal every transmission interval (T) by a frequency division of a transmission clock of the first network; and a processor module for controlling in a manner such that when a transmission request of a data stream is received, the transmission data is read out from the data storage unit and is stored into the buffer memory and, each time a transmission timing signal is derived from the timer unit, the transmission data is read out from the buffer memory to the network interface on a unit basis of a data amount DL and is transmitted to the first network. It is also possible to construct in a manner such that the timer unit generates the transmission timing signal every transmission interval (T) by a clock obtained by frequency dividing a clock generated from a general clock generating circuit without using the clock of the first network. In the case where a second network has a plurality of different constant bit rates n1 and n2 in accordance with the kind of transmission data, the server unit transmits the data every transmission interval T1 or T2 which was set every constant bit rate n1 or n2. For example, a timer unit of the server unit has a programmable frequency dividing circuit. When the constant bit rate n1 is used, a frequency dividing ratio of the programmable frequency dividing circuit is set so that the transmission interval T1 is equal to $$T1=DL/n1$$

When the constant bit rate n2 is used, a frequency dividing ratio of the programmable frequency dividing circuit is set so that the transmission interval T2 is equal to $$T2=DL/n2$$

In the case where the first network has a plurality of different constant bit rates n1 and n2 in accordance with the kind of transmission data, the server unit transmits different transmission data amounts DL1 and DL2 by using the same transmission interval (T). Namely, the transmission interval (T) is obtained so as to satisfy the following relation, $$T=DL1/n1=DL2/n2$$

thereby enabling the data to be transmitted at the same time interval (T) even if the constant bit rates n1 and n2 and the transmission data amounts DL1 and DL2 are different.

When a plurality of data stream transmission requests are received, the processor module reads out a plurality of transmission data from the data storage unit and stores into the buffer memory and, each time the transmission timing signal is obtained from the timer unit, the processor module time-divisionally reads out each of the transmission data on a unit basis of a predetermined data amount DL from the buffer memory to the network interface, thereby allowing the read-out transmission data to be multiplexed and transmitted to the second network. In this case, the processor module registers flag information indicative of the presence or absence of the transmission request and a request stream name every plurality of terminals as request destinations of the data transmission. When a transmission timing signal is received from the timer unit, the processor module time-divisionally multiple transmits the data stream requested by referring to the flag information. In the case where there are a plurality of same request stream names by the reference to the flag information, the same data is time-divisionally multiplexed and transmitted. In this case, when the transmission data is read out from the data storage unit, the same data is divided on a unit basis of the request destination and is written into the buffer memory a plurality of number of times. The same data in the buffer memory is time-divisionally multiple transmitted. The processor module has a CPU which operates by a program control. Further, the processor module has a direct memory access controller (DMA controller) and executes a data reading control from the data storage unit to the buffer memory and a data transmission control from the buffer memory to the network interface independent of processes of the CPU. The processor module can also execute the data reading control from the data storage unit to the buffer memory and the data transmission control from the buffer memory to the network interface by the execution of a read/write command by the program control of the CPU in place of the DMA controller. A hard disk is used as a data storage unit of the server unit. A software timer which is realized by a program of the processor module can be also used as a frequency dividing circuit as a hardware of the timer unit. The frequency dividing circuit, in this case, counts the number of fundamental clocks and generates a transmission timing signal when the count value coincides with the value in which the transmission interval (T) is expressed by the number of fundamental clocks.

As a specific example of the invention, the first network of the variable bit rate is an ATM network, the second network of the constant bit rate is a CATV network, and the server unit transmits the data to the ATM network at a transmission interval adapted to the constant bit rate of the CATV network. In this case, the server unit comprises: a hard disk for storing transmission data on a stream unit basis; a buffer memory for temporarily storing the data which is transmitted from the hard disk to an ATM network; an ATM card for transmitting the data in the buffer memory to the ATM network; a timer unit for generating a transmission timing signal each time an arrival of the transmission interval (T) is judged by the counting of fundamental clocks based on a transmission clock of the ATM network; and a processor module for controlling in a manner such that when a transmission request of the data stream is received, the transmission data is read out from the hard disk and stored into the buffer memory and, each time the transmission timing signal is obtained from the timer unit, the transmission data is read out from the buffer memory on a data amount DL unit basis to the ATM card and is transmitted to the ATM network. Animation data of MPEG1 or MPEG2 has been stored in the hard disk. The constant bit rate of the CATV network is set to n1 (=1.536 Mbps) which is used for MPEG1 and to n2 (=6.144 Mbps) which is used for MPEG2. Now assuming that an amount of data to be transmitted per one time is set to DL1 (=4.512 kB) in case of MPEG1 and to DL2 (=18.047 kB) in case of MPEG2 (where, 1 B=8 bits), the transmission interval (T) is set to $$T=DL1/n1=DL2/n2=23.5 \text{ msec}$$

The timer card frequency divides a clock synchronized with a peak rate (156 Mbps) of the ATM network, thereby producing the transmission timing signal.

As another specific example, the first network of the variable bit rate is an LIN network, the first network of the constant bit rate is a CATV network, and a server unit 12 transmits data to the LIN network at a transmission interval adapted to the constant bit rate of the CATV network. Further, the second network may be also an exclusive-use line network.

According to the multiple video server system of the invention as mentioned above, a network card which is ordinarily used, for example, an ATM card is used as it is for the network interface of the server unit and the data of a variable bit rate can be easily converted to the data of a constant bit rate by a transmitting instruction according to the transmission timing (T) by the timer unit. Costs of the system can be reduced and a system performance can be improved without needing a network card of a high performance.

The above and other objects, features, and advantages of the present invention will become more apparent from the following detailed description with reference to the drawings.

BRIEF DESCRIPTION OF THE DRAWINGS

FIG. 13 is an explanatory diagram of management information of a multiple transmission using a user flag in FIG. 12;

DETAILED DESCRIPTION OF THE PREFERRED EMBODIMENT

[System construction]

Figure 1:
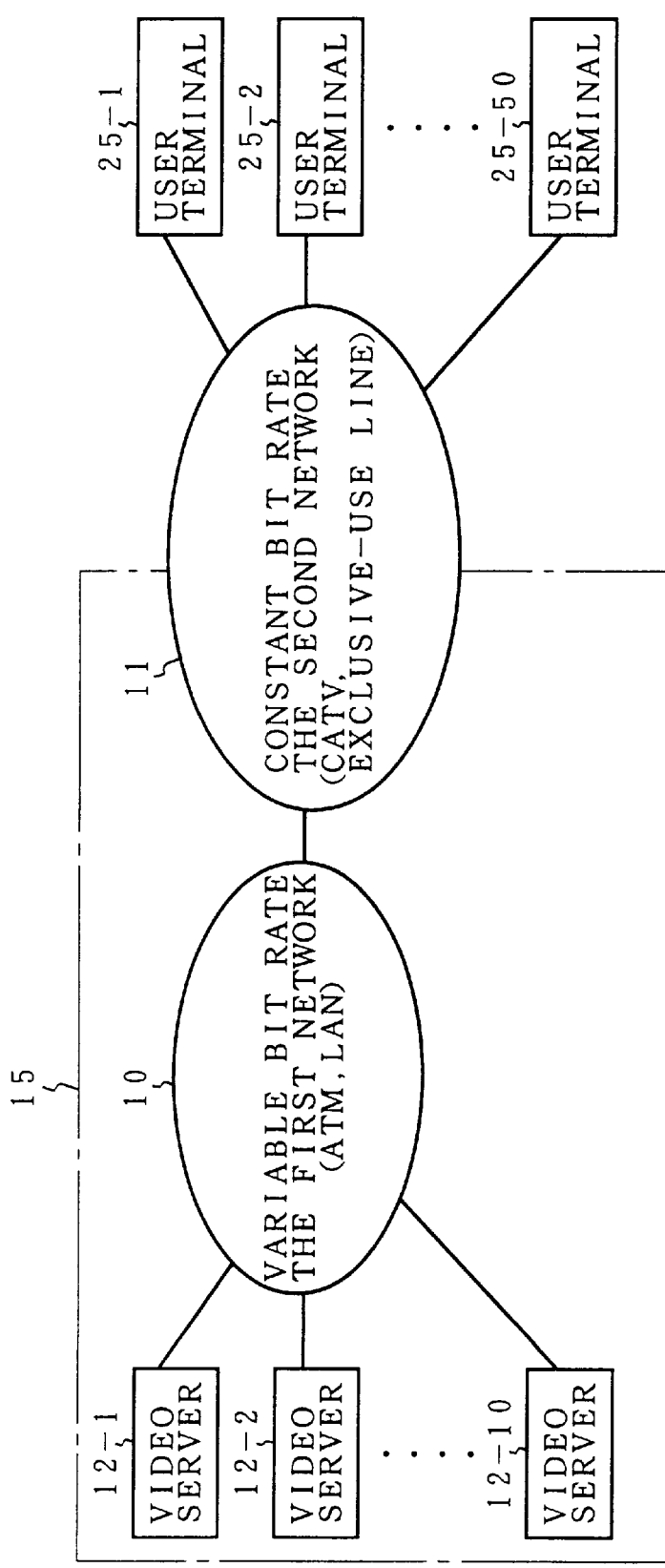
FIG. 1 is a system block diagram using a multiple video server system of the invention.

FIG. 1 is a diagram showing a video server system using a multiple video server system of the invention. For example, ten video servers 12-1 to 12-10 are provided for a video transmission center 15. Outputs of the video servers 12-1 to 12-10 are selectively transmitted through a variable bit rate network 10. An ATM network, an LAN network, or the like can be used as a variable bit rate network 10. In the following embodiment, for example, the ATM network is used as a variable bit rate network. An output of the variable bit rate network 10 is connected to a constant bit rate network 11. A CATV network, an exclusive-use line network, or the like is used as a constant bit rate network 11. In the following embodiment, for example, a CATV network is used as a constant bit rate network 11. A plurality of, for example, 50 user terminals 25-1 to 25-50 are connected to the constant bit rate network 11.

Figure 2:
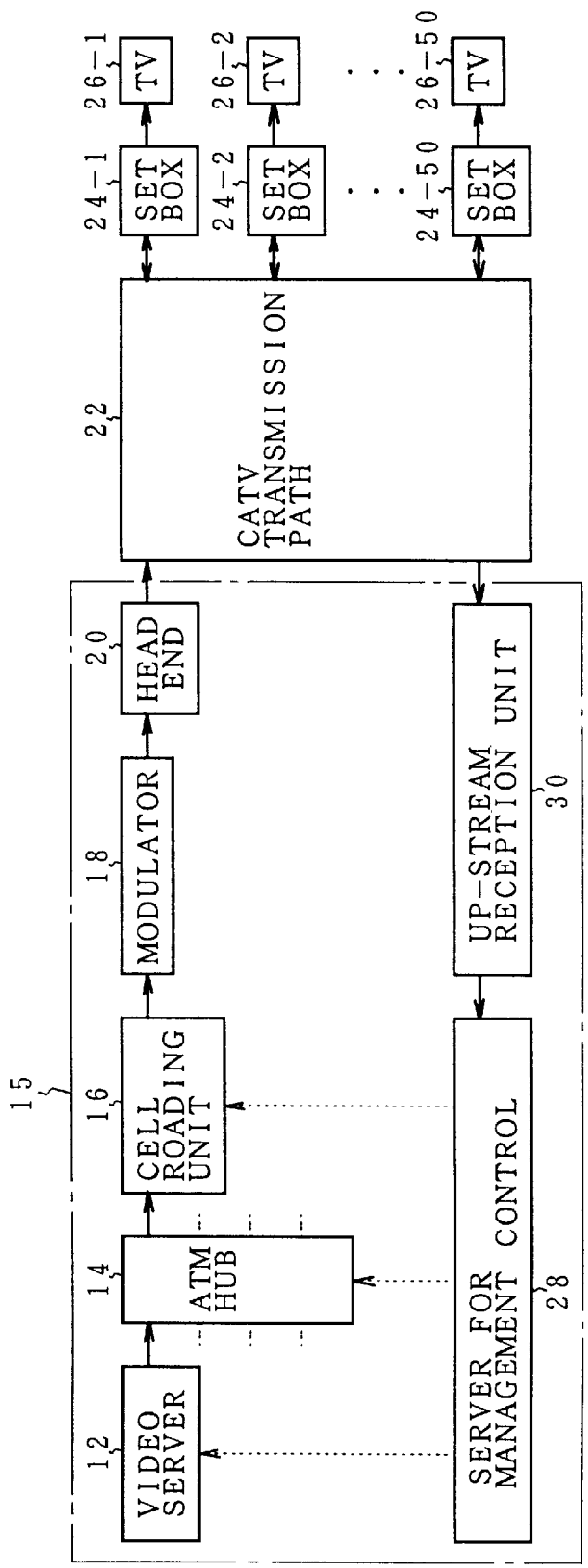
FIG. 2 is a specific system block diagram of FIG. 1.

FIG. 2 shows a specific embodiment of FIG. 1. A video server 12 is provided for the video transmission center 15. Although a plurality of video servers other than the video server 12 are obviously provided, one video server is shown as a representative. Video data has been stored in a data storage unit such as a hard disk or the like in the video server 12, the video server 12 transmits data of a corresponding video stream in accordance with a request from the terminal. MPEG1 or MPEG2 is used as a target of the storage data of the hard disk of the video server 12. A transmission frame of the video data that is outputted from the video server 12 is set to MPEG2-TS (MPEG2-transport stream). The video data according to the transmission frame of MPEG2-TS of MPEG1 or MPEG2 from the hard disk of the video server 12 is set to a constant bit rate. A transmitting speed of MPEG1 is set to 1.536 Mbps. A transmitting speed of MPEG2 is set to 6.144 Mbps. Subsequent to the video server 12, an ATM hub 14 constructing the variable bit rate network 10 is provided. The ATM hub 14 operates as a switching hub for a plurality of video servers. As mentioned above, since the output of the video server 12 is sent to the ATM hub 14 of the variable bit rate, an ATM card is used at the output stage of the video server 12 as a network interface for a variable bit rate network constructed by the ATM hub 14. Therefore, the video server 12 converts the transmission frame of MPEG2-TS of the video data of MPEG1 or MPEG2 which was read out from the hard disk at the constant bit rate into a cell of 53 bytes in the ATM network and outputs. According to the invention, the transmission at the variable bit rate by the ATM card at the output stage of the video server 12 is characterized in that the video data converted to the constant bit rate is transmitted to the ATM hub 14 so as to correspond to the CATV network of the constant bit rate as a network for a final data transmission. The details of the conversion to the constant bit rate at the output stage of the video server 12 will be clearly explained herein later. Subsequent to the ATM hub 14, a cell loading unit 16 is provided. The cell loading unit 16 divides a payload portion of 48 bytes as a data portion in the cell of 53 bytes which was received through the ATM hub 14 every plurality of MPEG-TS streams and reconstructs. Subsequent to the cell loading unit 16, a modulator 18 of the CATV system is provided. The modulator 18 frequency modulates the plurality of MPEG-TS streams reconstructed by the cell loading unit 16 into a frequency band, namely, a band of 6 MHz per one channel in the CATV system and outputs. A head end 20 frequency modulates a number of video data which was modulated to a 6-MHz band and outputted from the modulator 18 into each channel frequency of, for example, a VHF band allocated as a transmission band of the CATV system. After that, the head end mixes the channel frequencies and generates to a CATV transmission path 22. Set boxes 24-1 to 24-100 and television sets 26-1 to 26-100 constructing user terminals 25-1 to 25-100 are provided on the terminating side of the CATV transmission path 22. The set boxes 24-1 to 24-100 demodulate the video data transmitted at the constant bit rate from the video transmission center through the CATV transmission path 22, namely, the original video data from MPEG2-TS streams and output the demodulated data to the television sets 26-1 to 26-100, thereby allowing them to be displayed. Each of the set boxes 24-1 to 24-100 has a program requesting function for the video transmission center 15. Therefore, the user can perform a request of a desired program to the video transmission center by using the set boxes 24-1 to 24-100. Program requests from the set boxes 24-1 to 24-100 are sent to the video transmission center through the CATV transmission path 22. The program request is reconstructed by an up-stream reception unit 30 and is supplied to a server 28 for a management control. The server 28 for a management control executes a stream server control in response to the program request from the user and outputs the video streams of the requested program. At the same time, the server 28 instructs a switching control to the ATM hub 14, selects the video server 12 which has outputted the video streams which received a transmission request, and allows the video server 12 to supply the transmission streams to the cell loading unit 16. Further, a cell loading control is also performed for the cell loading unit 16, thereby reconstructing the transmission frame of MPEG2-TS from the cell obtained through the ATM hub 14.

[Transmission frame of video data]

Figure 3:
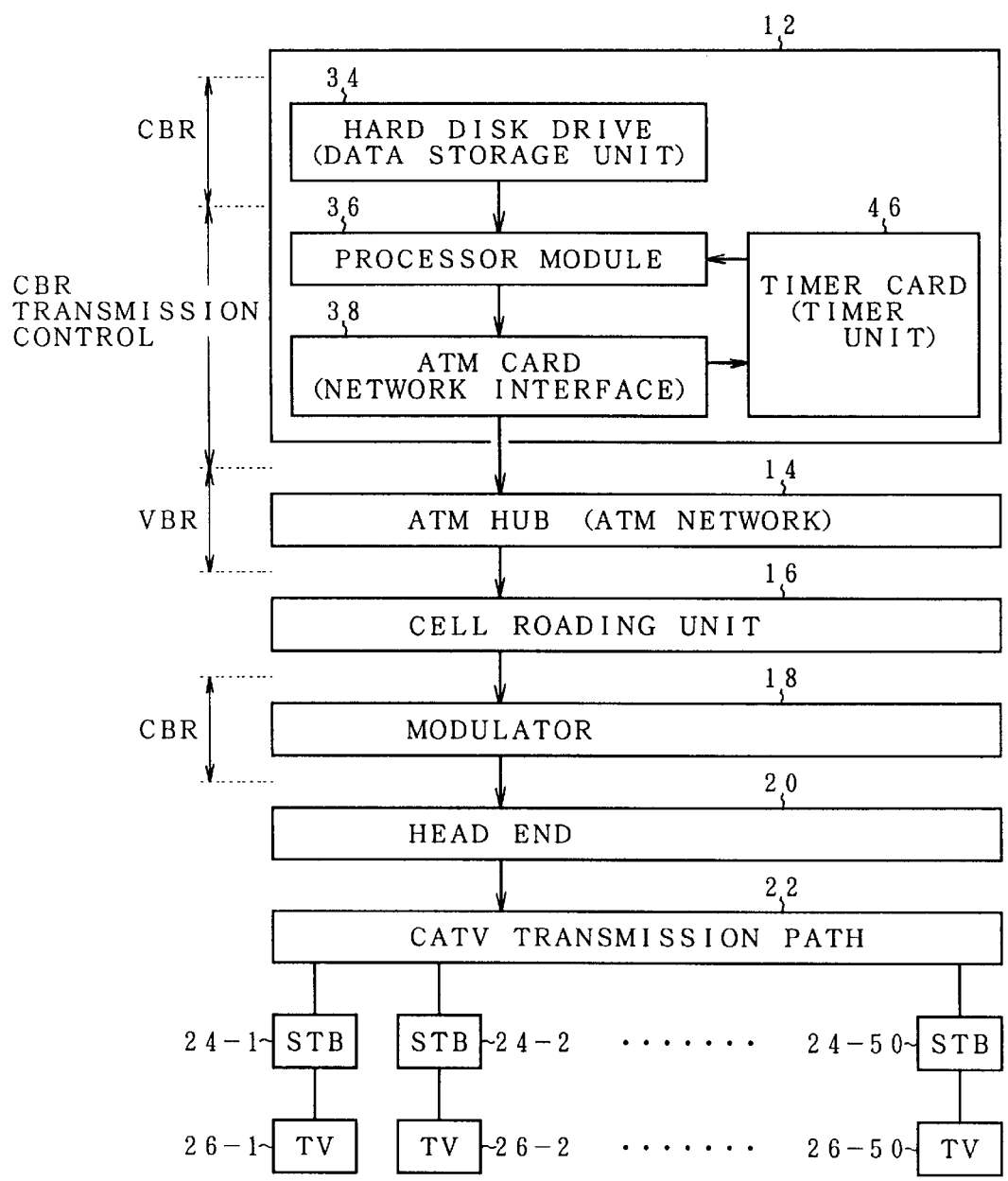
FIG. 3 is an explanatory diagram of a bit rate of a video server in FIG. 2 and a bit rate of a whole system.

FIG. 3 is a schematic diagram of an internal construction of the video server 12 provided for the video transmission center in FIG. 2 and also shows a system from the video server 12 to the television set 26-1 of the user. The video server 12 has: a hard disk 34 as a data storage unit; an ATM card 38 as a network interface for the ATM hub 14; and a timer card 46 as a timer unit for converting the transmission data from the ATM card 38 to the ATM hub 14 to a constant bit rate. A transmission frame of the transmission data from the hard disk 34 to the ATM card 38 in the video server 12 is as shown in FIG. 4.

Figure 4:
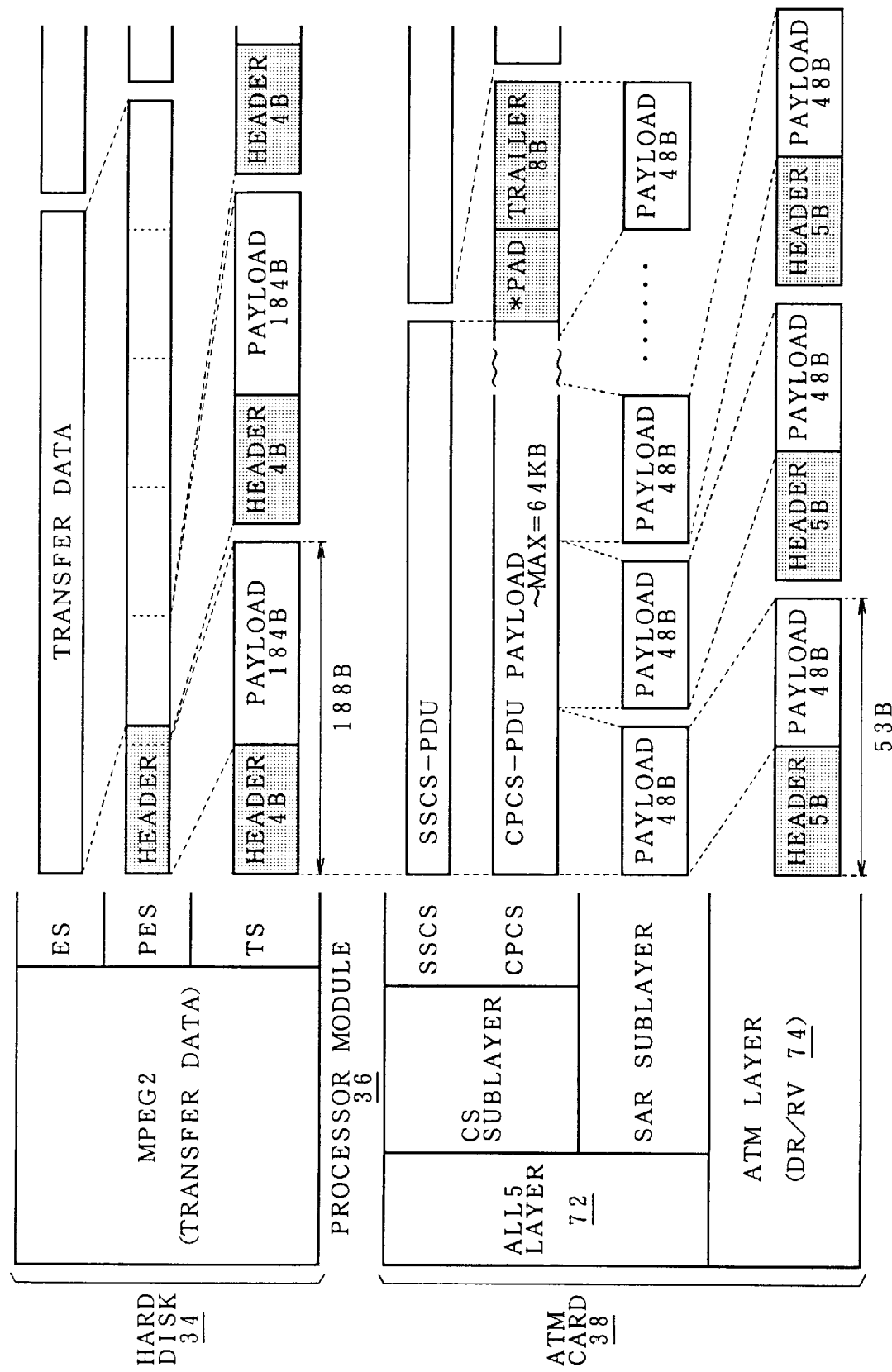
FIG. 4 is an explanatory diagram of a transmission data structure in the video server in FIG. 3.

In FIG. 4, the transmission data according to MPEG2 has been stored in the hard disk 34. As for the transmission data, transfer data as an elementary stream ES has been stored at the stage of a disk medium and has been stored as one continuous stream data from the head to the end of a video program. By adding a header to the head when the transfer data as an elementary stream ES is read out from the hard disk 34, the transfer data is converted into the elementary stream which was formed as a packet, namely, into PES. Finally, the packet elementary stream PES is converted to a transport stream TS of a unit of 188 bytes constructed by the header of 4 bytes and the payload of 184 bytes as a data portion and is outputted as read data to the outside. The conversion to the transport stream TS based on the reading operation of the elementary stream ES in the hard disk 34 is realized by a control card for MPEG2 provided for the control unit of the hard disk 34. The transport stream TS which was read out from the hard disk 34 is converted into the constant bit rate by the execution of an application program by a processor module 36 and is supplied to the ATM card 38. In the embodiment, an AAL type 5 known as a protocol of a service class C of an ATM adaptation layer AAL is used as an ATM card 38. As a whole structure of the ATM protocol, it is constructed by an upper layer, an ATM adaptation layer AAL, an ATM layer, and a physical layer. The ATM adaptation layer AAL is divided into a process of a payload unit (48 bytes of user information) of the cell and a process of an information unit which is obtained by combining those payloads. The process of the payload unit of the cell is called a cell division assembly, namely, a segmentation and reassembly SAR. The process of an information unit which is obtained by combining the payloads is called a convergence sublayer (CS). The convergence sublayer CS is finely divided in accordance with the type of protocol. As shown in FIG. 4, the ATM adaptation layer AAL5 is divided into a service specific CS portion and a common part CS (CPCS) portion. Namely, MPEG2-TS of the unit of 188 bytes which was read out from the hard disk 34, namely, the transport stream is converted to a protocol data unit (PDU) by an SSCS unit in a CS sublayer of an AAL5 layer 72. A trailer of eight bytes is added to the PDU by a CPCB unit. Subsequently, the user data is divided into payloads of a 48-byte unit by an SAR sublayer and sent to the ATM layer. In the ATM layer, by adding a header of five bytes to the head of the payload of 48 bytes, a cell of 53 bytes is assembled and is transmitted at a rate of 156 Mbps as a data transmitting speed of the ATM network to the ATM hub 14 side.

[Conversion of server output to constant bit rate]

In FIG. 4, in the case where the video data of the constant bit rate which was read out from the hard disk 34 is transmitted from the ATM card 38 at a variable bit rate, by providing the timer card 46 for the video server 12 in FIG. 3, the conversion to the constant bit rate of the data transmission for the ATM network having the ATM hub 14 is realized at a data transmitting speed of the constant bit rate of 1.536 Mbps or 6.144 Mbps of the CATV network after the modulator 18. Namely, the data of an amount necessary for the data transfer of a constant bit rate n [Mbps] in the CATV network is outputted from the ATM card 38 to the ATM hub 14 at a predetermined period, thereby enabling the timer card 46 to realize the conversion to the constant bit rate. Therefore, the timer card 46 obtains a timing of a transmission interval (T) from the transmission rate n [Mbps] of the CATV system and the transmission data amount of one time for the processor module 36. The transmission interval (T) is formed by frequency dividing a clock that is obtained from the variable bit rate network of the ATM hub 14. A data transmission is instructed to the processor module 36, thereby allowing the data transmission to be performed from the ATM card 38. Namely, the transmission interval (T) to instruct the transmission timing by the timer card 46 is defined by $$\text{Transmission interval } T = \quad (1)$$

(transmission data amount per one time)/(transmission rate)

Since the transmission data amount per one time is defined by a transmission buffer amount of a buffer memory assured in a memory unit of the processor module 36, the equation (1) can be expressed as follows.

$$\text{Transmission interval } T = \quad (2)$$

(transmission buffer amount)/(transmission rate)

Specifically speaking, in the case where the video data is based on MPEG1, since the transmission data amount of one time is equal to 4.512 kbytes, the transmission interval (T) which is set into the timer card 46 is as follows.

$$\text{Transmission interval } T = \quad (3)$$

$$(4.512 \text{ kbytes} \times 8 \text{ bits})/(1.536 \text{ Mbps}) = 23.5 \text{ msec}$$

In the case where the video data is based on MPEG2, since the transmission data amount of one time is equal to 18.048 kbytes, which is four times as large as the amount in the above case, the transmission interval (T) is obtained as follows.

$$\text{Transmission interval } T = \quad (4)$$

$$(18.048 \text{ kbytes} \times 8 \text{ bits})/(6.144 \text{ Mbps}) = 23.5 \text{ msec}$$

Namely, with respect to the case where the constant bit rate of the CATV network is any one of 1.536 Mbps and 6.144 Mbps, each time the timing reaches a timing of the transmission interval T (=23.5 msec) based on the clock of the ATM hub 14 obtained through the ATM card 38, the timer card 46 outputs a transmitting instruction, namely, a transmission timing signal to the processor module 36 and periodically executes the data transmission of a predetermined transmission buffer amount. In order to equalize the transmission intervals (T) in case of MPEG1 and MPEG2, the transmission buffer amount has been changed. However, on the contrary, it is also possible to set the transmission buffer amount to a constant value and to change the transmission interval (T). For example, assuming that the transmission buffer amount is fixed to 4.512 kbytes, although the transmission interval T (=23.5 msec) from the equation (3) in case of MPEG1, the transmission interval (T) can be also set to 5.875 msec, that is ¼ of 23.5 msec, in case of MPEG2. However, when the transmission interval (T) is switched with respect to MPEG1 and MPEG2, a construction of the timer card 46 is complicated. Therefore, as shown in the equations (3) and (4), it is desirable to change the transmission buffer amount so that the transmission interval (T) is set to a constant value (=23.5 msec) even if the transmission rate changes.

[Video server]

Figure 5:
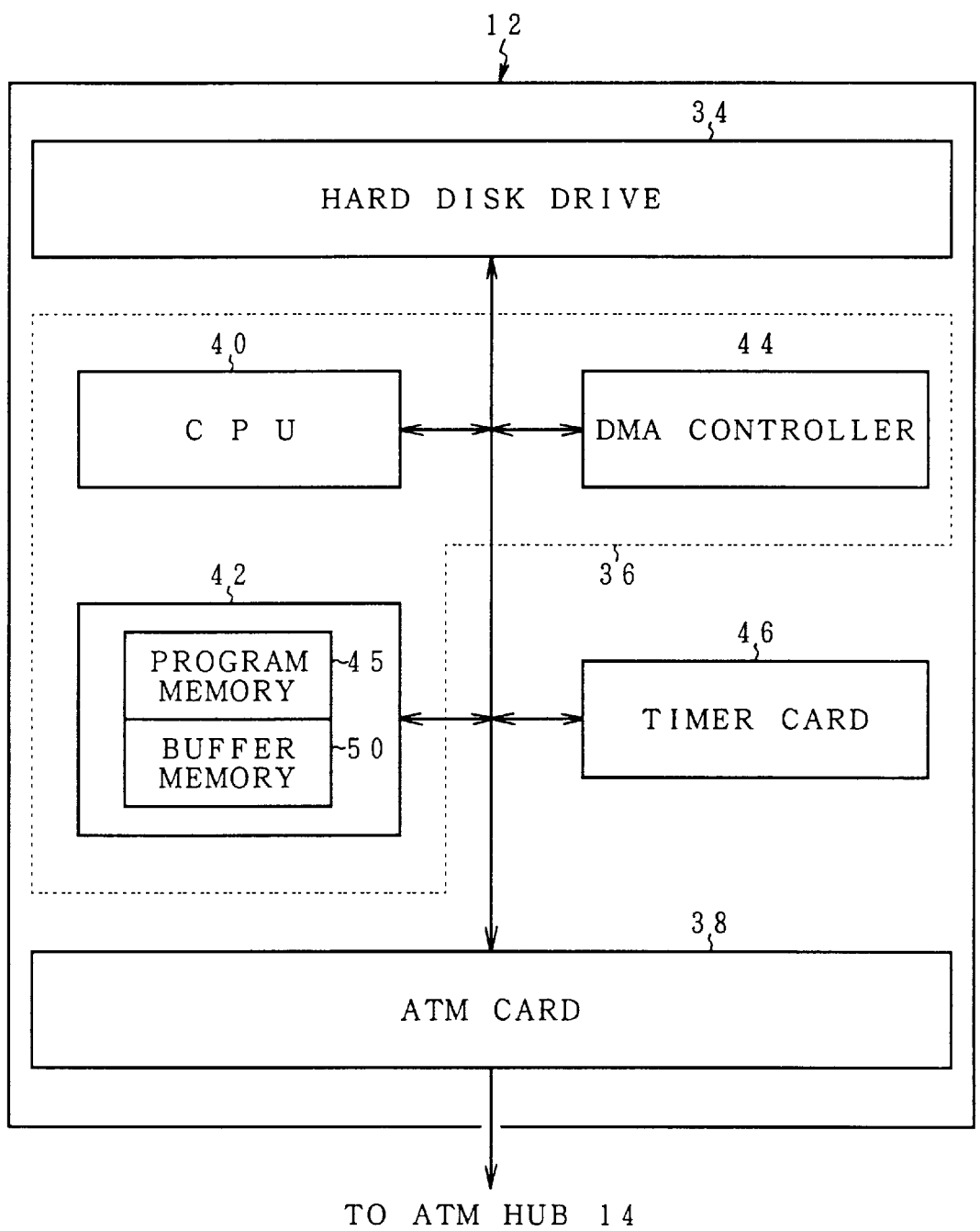
FIG. 5 is a block diagram of a hardware construction of a processor module in FIG. 3.

FIG. 5 is a diagram showing the details of the processor module 36 in the video server 12 in FIG. 3 and also shows the hard disk 34 and ATM card 38. The processor module 36 is constructed by a CPU 40, a memory unit 42, and a DMA controller 44. The memory unit 42 has memory areas of a program memory 45 which is used for the CPU 40 to execute processes for converting the transmission data to a constant bit rate and for transmitting and a buffer memory 50 which is used for converting the data into a constant bit rate and for transmitting the converted data. The DMA controller 44 transfers the video data of the transmission frame of MPEG2-TS which was read out from the hard disk drive 34 to the buffer memory 50 without being subjected to a program control by the CPU 40 and, further, executes a data transfer from the buffer memory 50 to the ATM card 38 by a direct memory access control.

Figure 6:
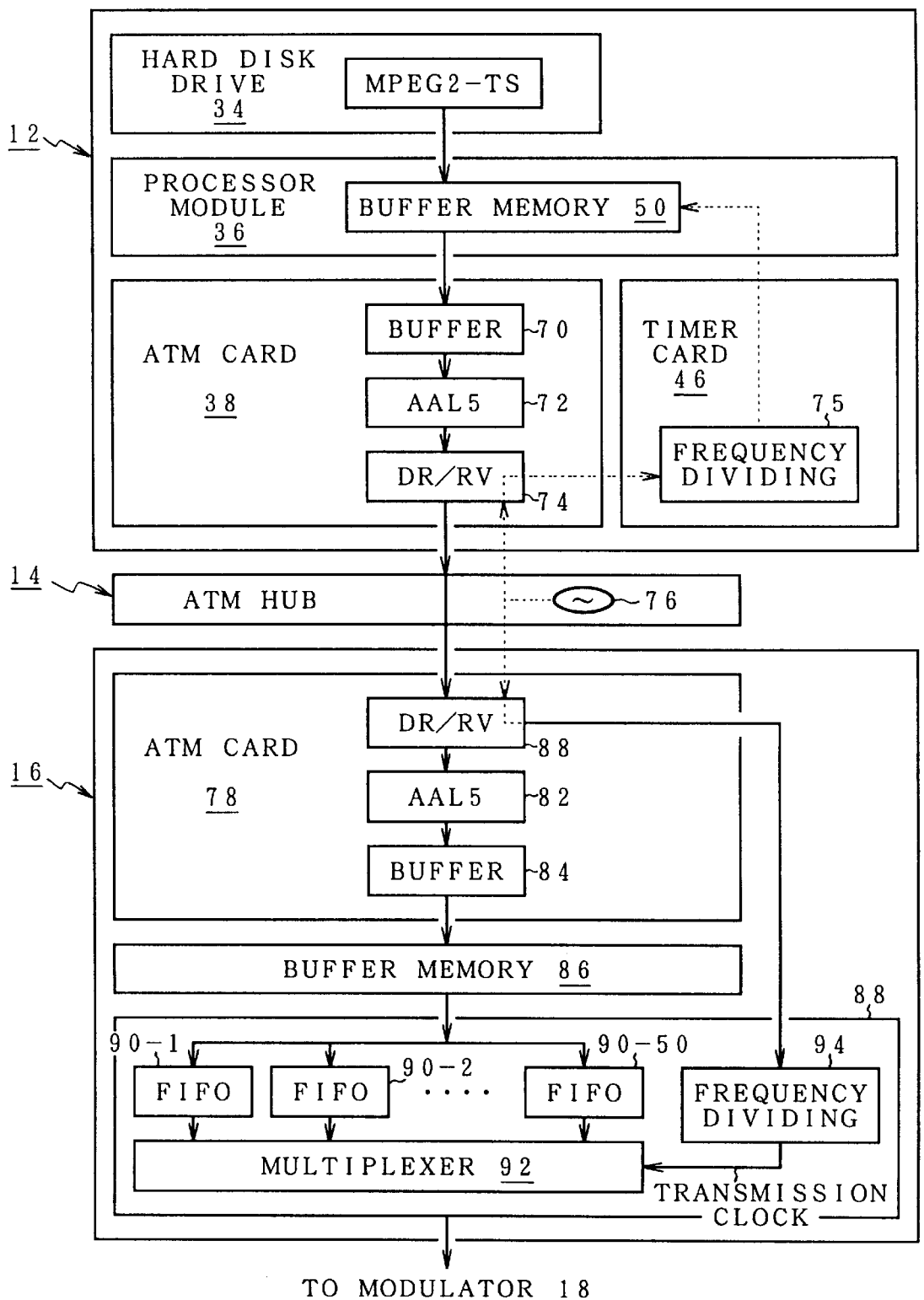
FIG. 6 is a functional block diagram of the video server in FIG. 3, an ATM hub, and a cell loading unit.

FIG. 6 is a diagram showing each function of the video server 12, ATM hub 14, and cell loading unit 16 in FIG. 3. The video server 12 has the hard disk drive 34 and reads out the transmission frame of MPEG2-TS as video data from the hard disk drive 34. The processor module 36 has the buffer memory 50 and transmits the data of a predetermined buffer amount from the buffer memory 50 to the ATM card 38 on the basis of a transmitting instruction, namely, a transmission timing signal from the timer card 46 for an application program for a data transmission control, which will be clearly explained hereinlater. The timer card 46 has a frequency dividing circuit 75. A clock signal of 156 MHz from an oscillator 76 which is provided for the ATM hub and is used to realize a transmission rate of 156 Mbps is frequency divided by the frequency dividing circuit 75, thereby generating a transmission timing signal of 23.5 msec. A frequency dividing value (N) of a frequency dividing ratio (1/N) to obtain a frequency divided clock of the transmission interval T (=23.5 msec) from the clock signal of 156 MHz that is obtained from the clock oscillator 76 of the ATM hub 14 is set to about ($3.666 \times 10^6$). The ATM card 38 is constructed by a buffer memory 70, the AAL5 layer 72, and a driver/receiver 74. The AAL5 layer 72 executes the data conversion of FIG. 4. The driver/receiver 74 constructs the ATM layer in FIG. 4. The cell loading unit 16 is constructed by an ATM card 78, a buffer memory 86, and a CATV card 88. Since the ATM card 78 executes a reception and a demodulation, it has a driver/receiver 80, an ALL5 layer 82, and a buffer 84 in accordance with the order opposite to that of the ATM card 38 of the video server 12. Now, assuming that the number of channels allocated to the CATV system is set to 50 channels within a range from 470 to 770 MHz of a UHF band, the CATV card 88 has fifty FIFO memories (First-in First-out memories) 90-1 to 90-50. The cell received by the ATM card 78 through the buffer memory 86 is stored in the FIFO memories 90-1 to 90-50 every stream data of each MPEG2-TS. The data stream of each MPEG2-TS stored in the FIFO memories 90-1 to 90-50 is sequentially read out by a multiplexer 92 and is sent to the modulator 18 and is frequency modulated. The multiplexer 92 performs a switching of the multiplexer 92 to time-divisionally read out the data from the FIFO memories 90-1 to 90-5 synchronously with a transmission clock obtained by frequency dividing the clock signal of 156 MHz from the clock oscillator 76 of the ATM hub 14 by a frequency dividing circuit 94. When the multiplexer 92 tries to sequentially generate outputs of the FIFO memories 90-1 to 90-50 of 50 channels at the transmission interval T (=23.5 msec), the frequency dividing circuit 94 supplies a frequency divided clock having a period that is 50 times as large as that of the frequency divided clock of the frequency dividing circuit 75 provided for the timer card 46 to the multiplexer 92 as a transmission clock, thereby sequentially reading out the data from the FIFO memories 90-1 to 90-50 at a period of 23.5 msec.

Figure 7:
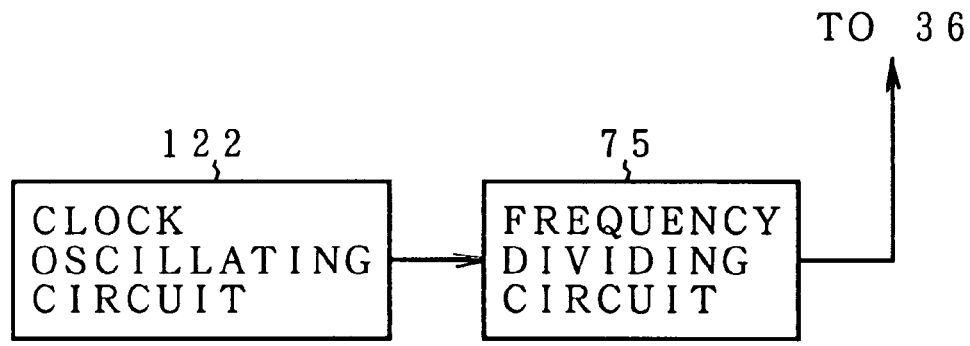
FIG. 7 is a block diagram of another embodiment of a timer card in FIG. 6.

FIG. 7 shows another embodiment of the timer card 46 in FIG. 6. A general clock oscillating circuit 122 is provided for the timer card 46 itself. A clock signal from the clock oscillating circuit 122 is frequency divided by the frequency dividing circuit 75 and a frequency divided clock of the transmission interval T (=23.5 msec) is produced and outputted as a transmission timing signal to the processor module 36. In this case, although not perfectly synchronized with the ATM network by the ATM hub 14, the data transmission converted to the constant bit rate based on the transmission rate of the CATV system can be easily realized.

Figure 8:
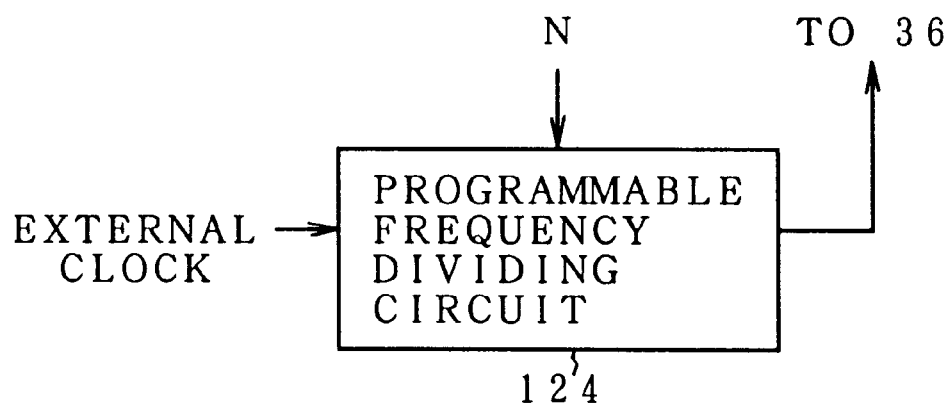
FIG. 8 is a block diagram of another embodiment of the timer card in FIG. 6 using a programmable frequency dividing circuit.

FIG. 8 shows another embodiment of the timer card 46 in FIG. 7 and is characterized in that a programmable frequency dividing circuit 124 whose frequency dividing ratio can be varied by a switching signal from the outside is used. A clock signal of 156 MHz from the clock oscillator 76 of the ATM hub 14 in FIG. 6 can be inputted to the frequency dividing circuit 124 or a clock from the general clock oscillating circuit 122 provided for the timer card can be also inputted as shown in FIG. 7. A frequency dividing ratio according to the constant bit rate of the CATV network is set into the programmable frequency dividing circuit 124. In the CATV network, a transmission rate of 1.536 Mbps is set for the transmission of the video data of MPEG1 and a transmission rate of 6.144 Mbps is set for the transmission of the video data of MPEG2. In this case, however, the transmission buffer amount is set to a constant value and the transmission interval (T) is changed in accordance with the transmission rate. That is, assuming that the transmission buffer amount of the transmission of MPEG1 of the transmission rate of 1.536 Mbps is set to 4.512 kbytes, a transmission interval T1 (=23.5 msec) is obtained from the equation (1). On the other hand, with respect to the transmission rate of 6.144 Mbps of MPEG2, since the transmission buffer amount is the same as 4.512 kbytes, a transmission interval T2 is equal to T2=5.875 msec, which is ¼ of T1. In the embodiment of FIG. 8, as for the data transmission of MPEG1 of the transmission rate of 1.536 Mbps, a frequency dividing ratio of the programmable frequency dividing circuit 124 is set to $$1/N = 1/(3.66 \times 10^6)$$

in a manner similar to the case of FIG. 6. On the other hand, in case of switching to MPEG2 of the transmission rate of 6.144 Mbps, it is sufficient to change the frequency dividing ratio of the programmable frequency dividing circuit 124 to $$1/N = 1/(0.9165 \times 10^6)$$

In the actual apparatus, in the case where the clock signal of 156 MHz of the ATM hub 14 is frequency divided into the clock signal of 23.5 msec or 5.875 msec by only the timer card 46, since the frequency dividing ratio is too large. Therefore, it is also possible to separately provide a frequency dividing circuit for the ATM card 38 and to execute the frequency division at two stages. For example, it is sufficient that after the clock signal of 156 MHz was frequency divided into ⅒ by the ATM card 38, the remaining necessary frequency division is executed by the frequency dividing circuit 75 of the timer card 46.

[Data transmission of constant bit rate]

Figure 9:
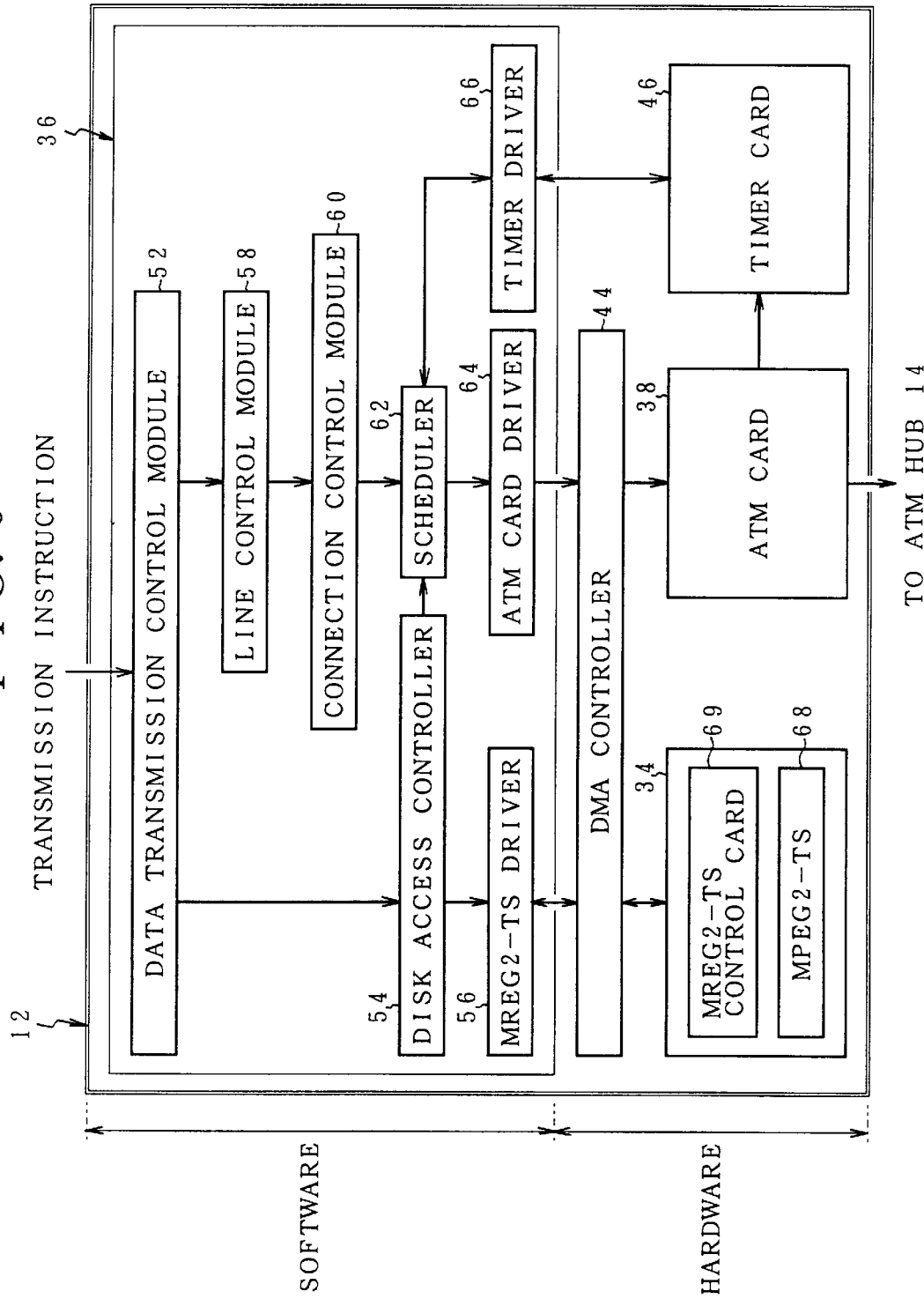
FIG. 9 is a functional block diagram of the processor module in FIG. 3.

FIG. 9 shows the details of a data transmission control module which is realized by the CPU 40 of the processor module 36 provided for the video server 12 in FIG. 5. By the execution of an application program by the CPU 40 of the processor module 36, a data transmission control module 52 shown as a software is realized. An application program of each of a disk access control 54, an MPEG-TS driver 56, a line control module 58, a connection control module 60, a scheduler 62, an ATM card driver 64, and a timer driver 66 is provided as an application program to realize the data transmission converted to the constant bit rate under the domination of the data transmission control module 52. The DMA controller 44, hard disk 34, ATM card 38, and timer card 46 are provided as a hardware for a software for the data transmission that is realized by a whole control of the data transmission control module 52 as mentioned above. In the processor module 36, a whole control is executed by the data transmission control module 52. The data transmission control module 52 instructs the line control module 58 to connect the network in the case where an event such that the video data should be transmitted occurs. At the same time, a data reading operation from the hard disk 34 is instructed to the disk access control 54. The line control module 58 instructs the connection control module 60 to connect to the ATM hub 14 as a network. As mentioned above, when the network is connected to the ATM hub 14 by the connection control module 60, a preparation of the data transmission is completed. Since the data transmission control module 52 instructs the data reading operation to the disk access control 54, the disk access control 54 intermittently reads out video data 68 of MPEG2-TS, as a data stream, designated by the hard disk 34 through the DMA controller 44 by the access control by an MPEG driver. The data is transferred to the scheduler 62. Specifically speaking, after the data read out from the hard disk 34 was stored into the buffer memory 50, a process is handed to the scheduler 62. On the other hand, in the timer card 46, the transmission interval (T) calculated on the basis of the equation (1) is set. Specifically speaking, the transmission interval T (=23.5 msec) obtained by the equations (3) and (4) is set. The transmission interval T (=23.5 msec) is realized by the formation of the frequency divided pulse obtained by the frequency dividing circuit 75 from the clock signal of 156 MHz derived from the ATM hub 14 in the timer card 46. A transmission instruction is interrupted to the timer driver 66, namely, a transmission timing signal is outputted synchronously with the leading edge of, for example, the H level of the frequency divided pulse. Therefore, each time a timing reaches the timing of the set transmission interval T (=23.5 msec), the timer card 46 generates the transmission timing signal as an interruption signal. On the basis of the reception of the transmission timing signal, the timer driver 66 periodically generates an instruction for the data transmission to the scheduler 62. On the basis of the transmitting instruction which is periodically outputted from the timer driver 66, the scheduler 62 executes the transmission of the data read out from the buffer memory 50 under the control of the disk access control 54. When the data to be transmitted doesn't exist in the buffer memory 50 during the data transmission, the scheduler 62 instructs the disk access control 54 to read out the data from the hard disk 34, so that the data which is transmitted from the scheduler 62 is continuously supplied to the buffer memory 50. The reading operation from the hard disk 34 by the disk access control 54 can be performed by the access control to an MPEG2-TS control card 69 on the hard disk 34 side by the MPEG2-TS driver 56. As shown on the hard disk 34 side in FIG. 4, the MPEG2-TS control card 69 forms an elementary stream PES which was formed as a packet from an elementary stream ES stored in the disk medium and finally forms a transport stream TS. The data streams are read out to the buffer memory 50 which is managed by the scheduler 62 under the control of the DMA controller 44.

Figure 10:
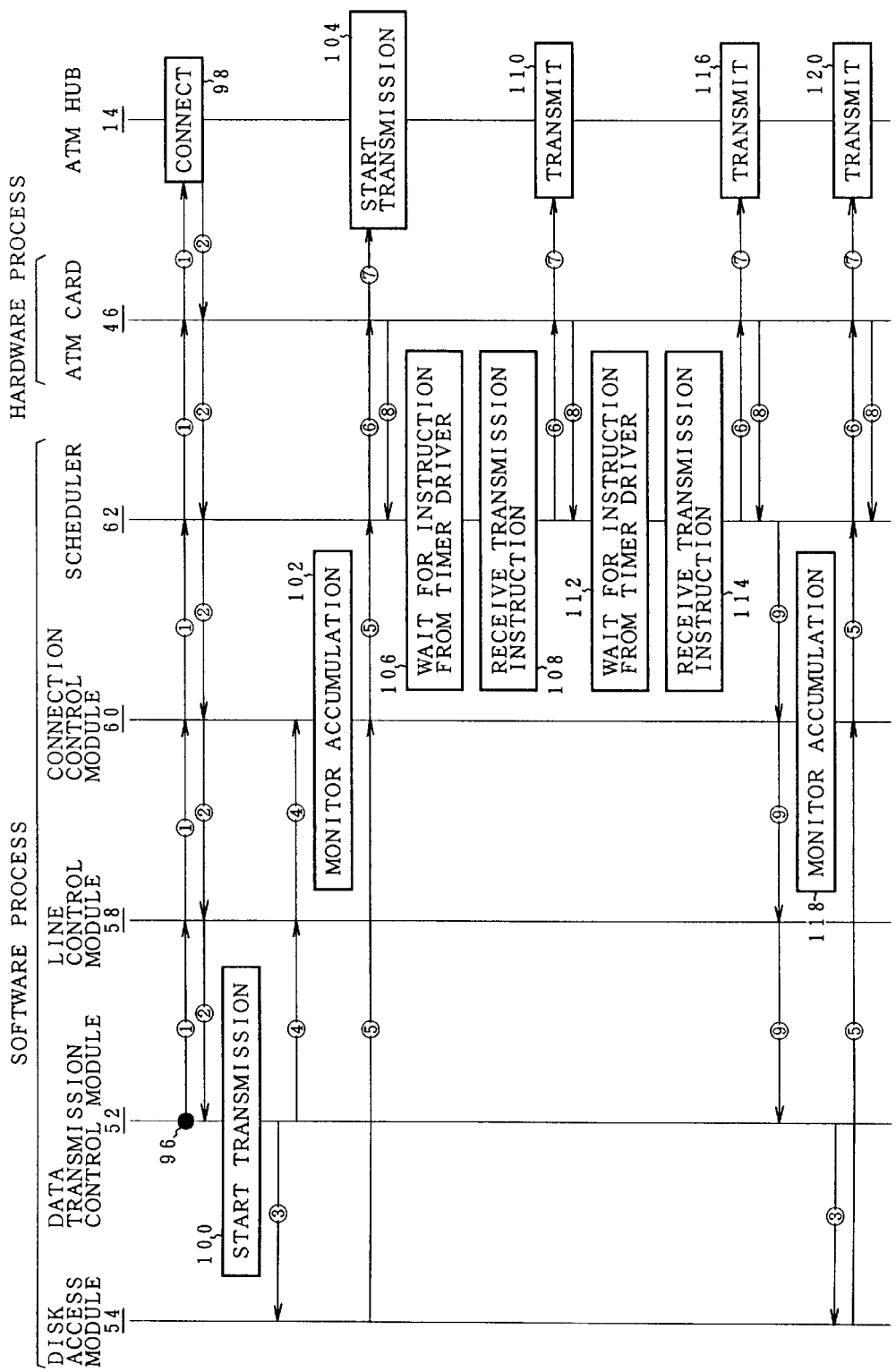
FIG. 10 is a time chart for a data transmitting sequence by the processor module in FIG. 9.

FIG. 10 is a timing chart for transmitting the data converted to the constant bit rate that is realized by the application program provided for the processor module 36 in FIG. 9. First, when a request event 96 of data transmission is generated to the data transmission control module 52, a connection is instructed to the line control module 58. The connecting instruction is transferred to the connection control module 60 and scheduler 62 and is further transferred through the ATM card 38 to the external ATM hub 14, so that a connection 98 is established. When the connection 98 is established, a connection response (2) is transferred to the data transmission control module 52 along a path opposite to the above path. The data transmission control module 52 which received the connection response (2) performs a transmission start 100 and first executes a data transfer request (3) to the disk access module 54. At the same time, the module 52 generates a line data transmitting request to the line control module 58 and connection control module 60. In the initial state, since the data to be transmitted doesn't exist in the buffer memory 50, an accumulation monitor 102 is performed. A data transfer (5) is performed from the hard disk under the control of the disk access control 54. The transfer data from the hard disk is stored into the buffer memory 50 which is managed by the scheduler 62. Subsequently, the scheduler 62 supplies the first transfer data to the buffer of the ATM card 38 as a DMA data transfer (6). The ATM card 38 uniformly executes a data transfer according to the variable bit rate, namely, a cell transfer of 53 bytes to the ATM hub 14 so as not to exceed a preset peak rate of the transmission bus. After completion of the first transmission of the data of the transmission buffer amount stored in the buffer memory 50, a transmission completion notification (8) of one transmission unit is notified to the scheduler 62 from the ATM card 38. The scheduler 62 waits for a transmitting instruction from the timer driver 66. When the timer driver 66 receives a transmission timing signal after the elapse of the transmission interval T (=23.5 msec) which was set in the timer card 46 from the first data transmission, the timer driver 66 instructs the transmission to the scheduler 62 by an interruption. The scheduler 62 recognizes the next data transmission timing by a transmission instruction reception 108 and transfers the data of an amount corresponding to the next transmission timing in the buffer memory 50 to the ATM card 38 by the DMA transfer (6). The ATM card 38 uniformly executes a division transfer of the cell to the ATM hub 14 so as not to exceed the preset peak rate. The above process becomes a data transmission 110 at the second time. After completion of the second data transmission 110, the transmission completion notification (8) of one transmission unit is notified from the ATM card 38 to the scheduler 62. The scheduler 62 enters an instruction waiting 112 from the next timer driver. On the basis of a transmission instruction reception 114 after the elapse of the transmission interval T (=23.5 msec), the data of an amount of one transmission unit from the buffer memory 50 is again transferred to the ATM card 38. The data transfer to the ATM hub 14, namely, a data transmission 116 at the third time is executed by the cell division from the ATM card. After the transmission completion notification (8) for the third data transmission 116 was received, when the scheduler 62 recognizes that the data to be transmitted doesn't exist in the buffer memory 50, a data transfer is requested to the data transmission control module 52 via the connection control module 60 and line control module 58. By receiving the data transfer request, the data transmission control module 52 executes a storage data transfer request (3) to the disk access module 54. In response to the storage data transfer request (3), the reading operation of the next transfer data from the hard disk is performed to the buffer memory 50. A state of the data transfer request to the disk drive is checked by an accumulation monitor 118 by the connection control module 60. After completion of the DMA transfer to the buffer memory 50, the scheduler 62 immediately transfers the data of an amount corresponding to one transmission timing to the ATM card 38. The data transmission by the cell division to the ATM hub 14 is executed as shown in a data transmission 120. Subsequently, processes similar to those mentioned above are repeated until the stream of the video data which is continuously read out from the disk drive is finished.

Figure 11:
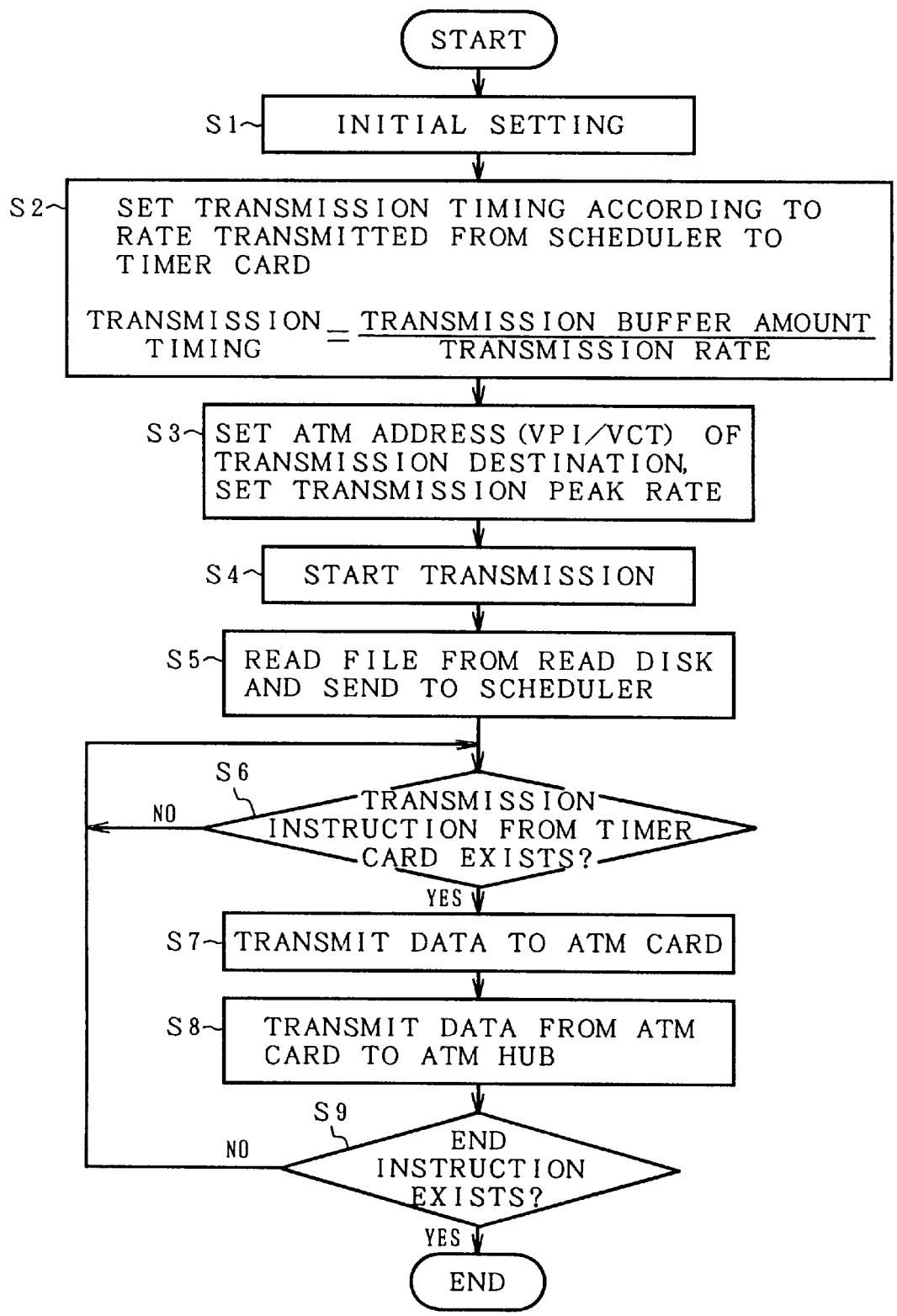
FIG. 11 is a flowchart for a data transmitting process by the processor module in FIG. 9.

FIG. 11 is a flowchart for a data transmitting process of the conversion into the constant bit rate which is executed by the data transmission control module 52 provided for the processor module 36 shown as a software in FIG. 9. When the apparatus is activated, first in step S1, an initial setting is performed. In this step, an initial setting of various drivers which are realized by the software of FIG. 9 and an initial setting of each unit and the card which are constructed by the hardware are executed. In step S2, the scheduler 62 sets the transmission interval (T) according to the constant bit rate of the CATV system as a transmission target into the timer card 46. In the embodiment, in the case where the CATV system is based on MPEG1, the transmission interval T (=23.5 msec) according to the equation (3) is set. In case of MPEG2 as well, the same transmission interval T (=23.5 msec) according to the equation (4) is set. However, even if the transmission timing (T) is set to the same value (T=23.5 msec), with respect to the storage unit of the transmission data of the buffer memory 50 which decides the transmission data amount of one time, 4.512 kbytes of the transmission buffer amount of one transmission unit of MPEG1 which gives the transmission interval (T) of the equation (3) is set as a buffer unit. On the other hand, with regard to MPEG2 of the transmission rate of 6.144 Mbps of the equation (4), 18.048 kbytes in which one transmission unit is increased by four times is set. In case of fixing the transmission buffer amount for a change in bit rate, the different transmission intervals T1 and T2 are set every bit rate. In step S3, an ATM address as a transmission destination is set. Namely, a virtual path identifier VPI indicating which one of a plurality of predetermined virtual paths VP is used and a virtual channel identifier VCI indicating that the data is transmitted to a partner by using which virtual channel VC in the designated virtual path VP are set. Further, a transmission peak rate when the data is sent from the ATM card 38 to the external ATM hub 14 is set. The transmission peak rate is set to a value which is slightly higher than a transmission rate in order to eliminate a TM cell loss. Subsequently in step S4, the data transmission is started. Namely, in step S5, a file of the hard disk is read and the data stream of MPEG2-TS is read out and supplied to the scheduler 62. The scheduler discriminates the presence or absence of a transmitting instruction of the timing according to the transmission interval (T) from the timer card 46 in step S6. When there is a transmitting instruction from the timer card 46 side, step S7 follows the scheduler 62 transmits the data of an amount of one transmission unit stored in the buffer memory 50 to the ATM card 38. By receiving the data transfer, the ATM card 38 performs the data transmission which was subjected to the cell division to the ATM hub in step S8. The transmission of the data converted to the constant bit rate based on the transmitting instruction for every transmission interval T (=23.5 msec) from the timer card 46 in steps S6 to S8 is repeated until an end instruction by a stop request of a transmission program is discriminated in step S9 from the user terminal side. When there is a program end instruction, a series of processes are finished.

[Multiple transmission of video data]

Figure 12:
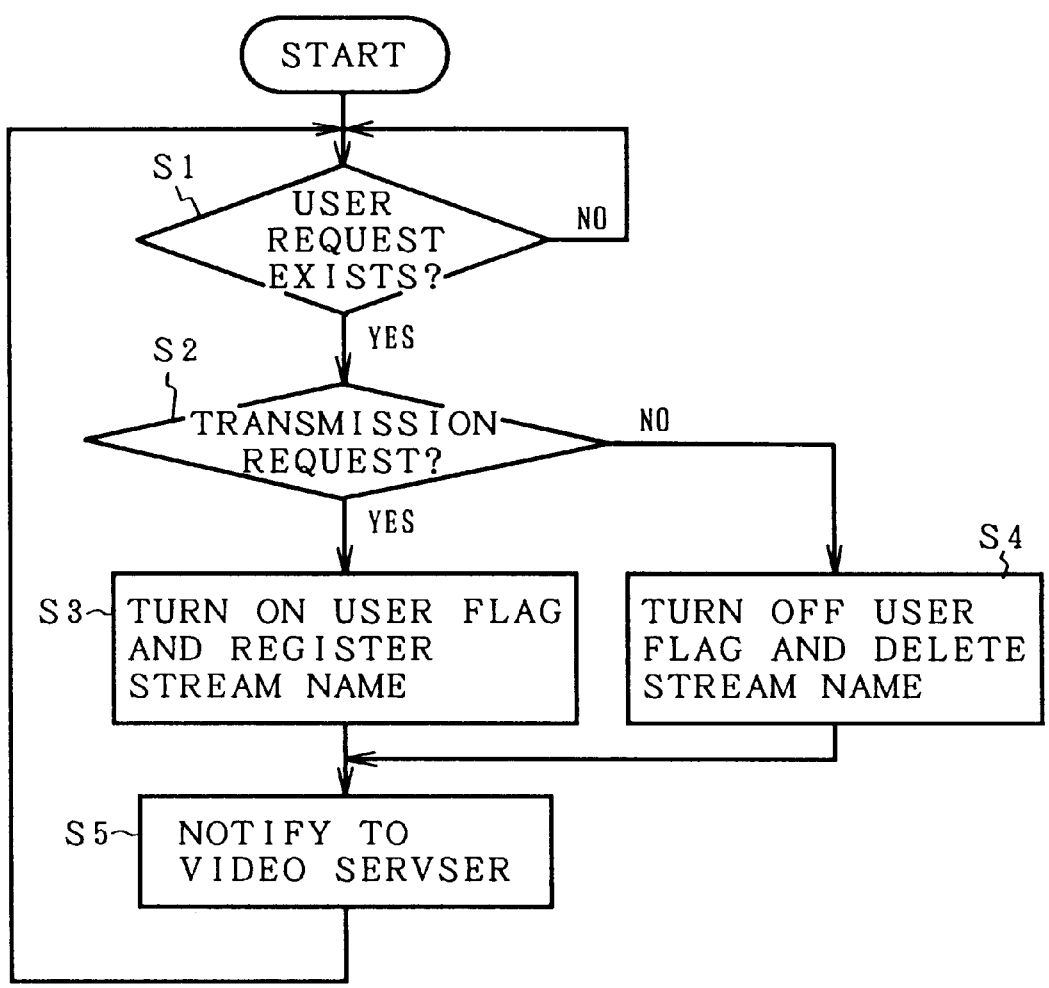
FIG. 12 is a flowchart for processes for a user request of a management control server in FIG. 2.

FIG. 12 is a flowchart for a control process of a program request by the server 28 for management control to the video server 12 in FIG. 2. In the management controlling server 28, the presence or absence of a user request is checked in step S1. When there is a user request, a check is made in step S2 to see if it is a data transmitting request. When it is the data transmitting request, a user flag is turned on and a stream name is registered in step S3. In step S5, a data transmission of a request stream name to the requesting user is instructed. In response to the data transmitting instruction, the video server 12 reads out the corresponding video stream from the disk drive and converts into a constant bit rate and transfers the cell to the ATM hub 14. The cell loading unit 16 returns the cell to the original data stream. The data stream is frequency modulated by the modulator 18 and is transmitted at the constant bit rate from the head end by using the allocated channel of the user terminal which requested. In step S2, when the user request is a stop request instead of the transmitting request, a user flag is turned off and the stream name is deleted in step S4. The end of the data transmission is instructed to the video server 12 in step S5.

Figure 14:
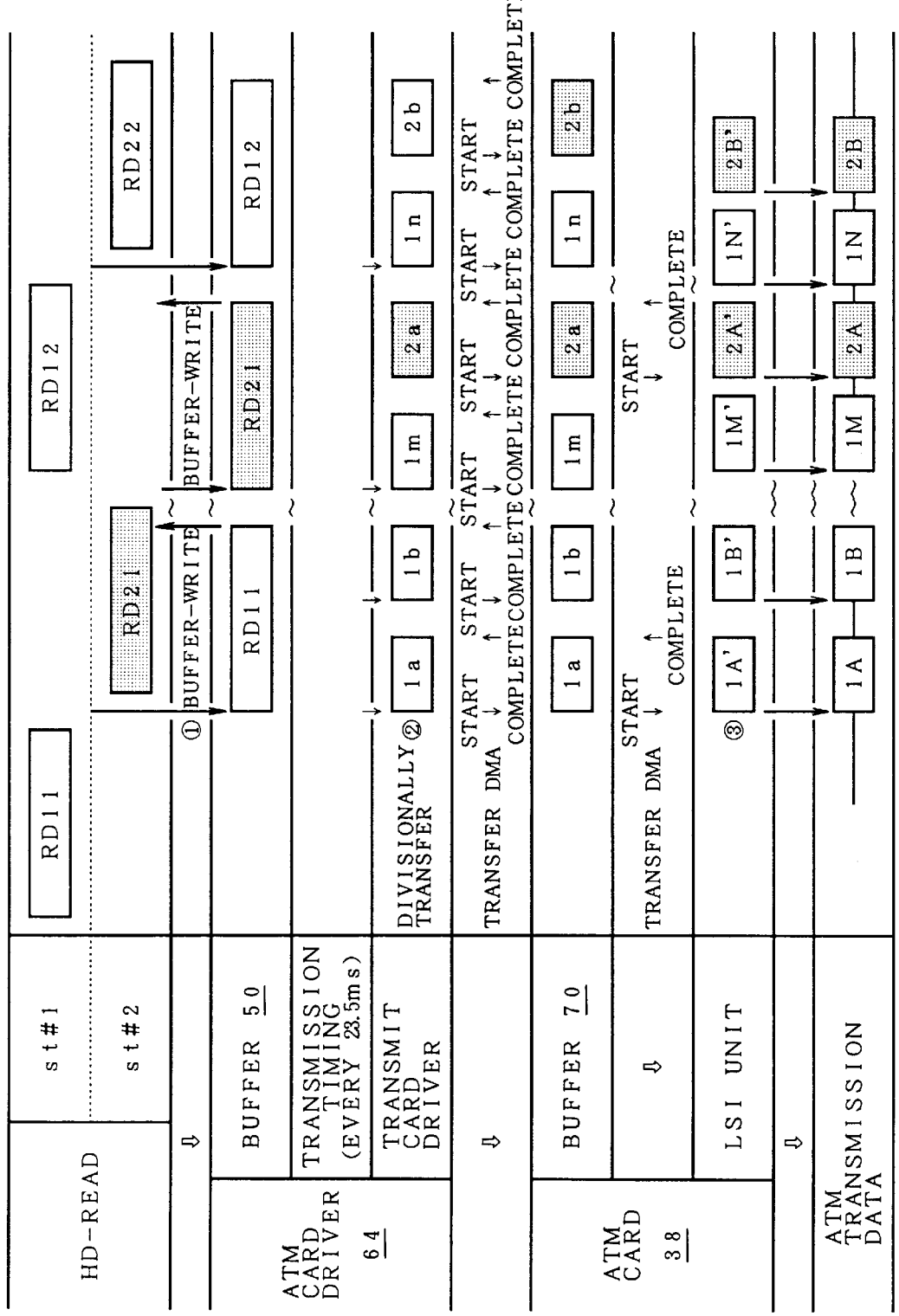
FIG. 14 is a time chart for a transmission of multiplexed data for two user requests.

The flag information of the user unit and the management information of the stream name which are managed in steps S3 and S4 in FIG. 12 are, for example, as shown in FIG. 14. The user management information is constructed by a user ID, a user flag, and a stream name (title name). As a user ID, a user ID of the user as a subscriber for the CATV system has previously been registered. The user flag is turned on when a program transmission is received from the user. The user flag is turned off to zero when a program stop request is received. When the user flag is turned on to 1, a stream name st#i of the program requested by the user is registered into the stream name. By performing the data transmission with reference to the user management information, the video streams of the necessary programs are multiple-processed and can be supplied to one or a plurality of users from the video transmission center 15.

FIG. 14 is a time chart showing a state of the data transmission in the video server 12 of the invention when another user requests another stream st#2 during the transmission of the stream st#1. First in an initial state, for example, it is now assumed that as shown in a user ID 0001 in FIG. 13, there is a data transmitting request and the user flag is turned on to 1 and the data transmission in which the stream name st#1 was designated has been being performed. For example, read data RD11 of the data stream st#1 by the first reading operation from the hard disk is stored as a buffer-write into the buffer memory 50 of the processor module. When a timing reaches the transmission timing of every transmission interval T (=23.5 msec) in the storing state of the read data RD11 into the buffer memory 50, for example, data 1a of the first one transmission unit in the buffer memory 50 is read out to the ATM card driver 64 and is written into the buffer memory 70 of the ATM card 38 by the DMA transfer. Further, the data is supplied as data 1A from the buffer memory 70 to an LSI portion in the ATM card 38, namely, to the AAL5 layer 72 shown in FIG. 6 and the driver/receiver 74 as an ATM layer. Finally, the data is transmitted as ATM transmission data and as data 1A of 53 bytes. The details of the data structure from the hard disk to the ATM transmission data are as shown in FIG. 4.

As mentioned above, the data transmission by the conversion to the constant bit rate according to the transmission timing of every 23.5 msec of the first read data RD11 which was written into the buffer memory 50 is executed. During the data transmission, it is now assumed that there is a data request by another user and the user flag is turned on to 1 and a stream name st#2 is registered for a user ID 0002 as shown in FIG. 13. Therefore, subsequent to the data stream st#1, the data stream st#2 is read out from the hard disk as shown by read data RD21 and is similarly stored into the buffer memory 50. As mentioned above, in a state in which the read data RD11 and RD21 of the data streams st#1 and st#2 have been stored in the buffer memory 50 in response to the two user requests, subsequent to the transmission of divisional data 1m from the read data RD11 of the data stream st#1 corresponding to the transmission timing, head divisional data 2a of the read data RD21 of the data stream st#2 is transferred. Such a data transfer is alternately repeated hereinafter.

Figure 15:
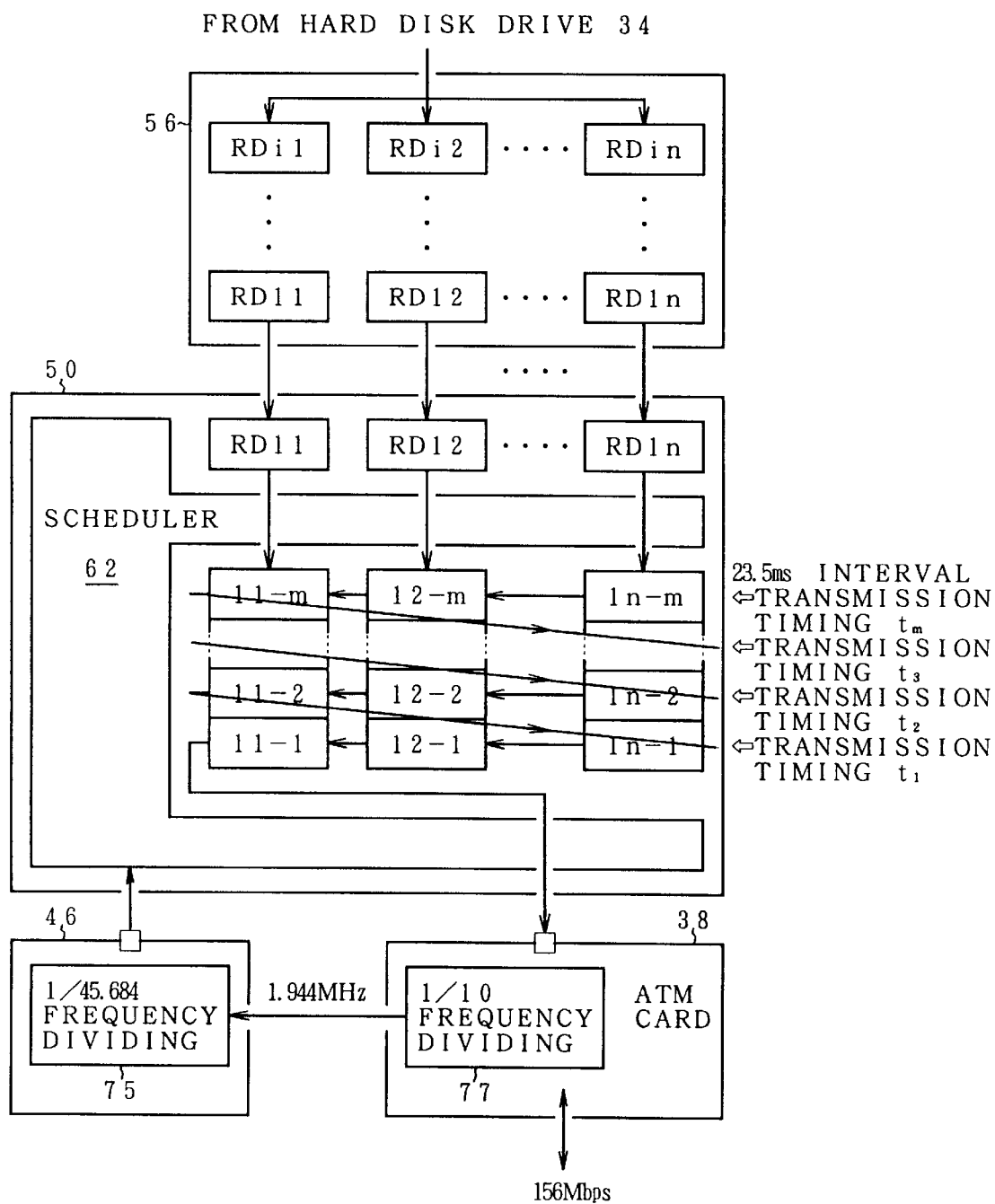
FIG. 15 is a time chart for a transmission of multiplexed data for (n) user requests.

FIG. 15 is a diagram showing a general form of the multiple transmission of a plurality of data streams. Now, assuming that the number of requests of the data transmission is equal to (n), read data RD11, RD12, . . . , and RD1n are read out from the hard disk 34 and stored into the buffer memory 50 in correspondence to data streams st#1, st#2, . . . , and st#n. When the data of an amount of each stream is read out and stored into the buffer memory 50, if the buffer memory has an enough large capacity, (i) read data RDi1, RDi2, . . . , and RDin as shown in the diagram can be continuously stored asynchronously with the data transmission. On the other hand, a clock according to the transmission rate of 156 Mbps from the ATM hub 14 side obtained via the ATM card 38 is frequency divided into, for example, $\frac{1}{10}$ by a frequency dividing circuit 77. After that, the frequency divided clock is further frequency divided into $\frac{1}{45.684}$ by the frequency dividing circuit 75 provided for the timer card 46. A transmission timing signal of the transmission interval T (=23.5 msec) is outputted to the scheduler 62. The transmission timing signal of the transmission interval T (=23.5 msec) is formed by frequency dividing the clock of 156 Mbps into $1/\alpha$ ($\alpha$=55.684). However, there is the following relation between the frequency dividing ratio (1/N) and a frequency dividing value $\alpha$.

$$1/N = 1/2^6$$

Namely, $$N = 2\alpha = 3.66 \times 10^6$$

When the transmission timing signal is received from the timer card 46 at every transmission interval of 23.5 msec, first as shown at a transmission timing t1, the scheduler 62 assures transmission data 11-1, 12-1, . . . , and 1n-1 of an amount of one unit as a transmission buffer amount from among the first read data RD11 to RD1n of the (n) data streams st#1 to st#n managed in the buffer memory 50 as transmission data of one unit. The scheduler 62 supplies those transmission data 11-1, 12-1, . . . , and 1n-1 to the ATM card 38 synchronously with the transmission timing t1. In a manner similar to the above, the transmission of the similar divisional data of the transmission buffer amount unit of an amount corresponding to the number (m) of streams to the ATM card 38 is repeated every transmission timings t2, t3, . . . , and tm.

Figure 16:
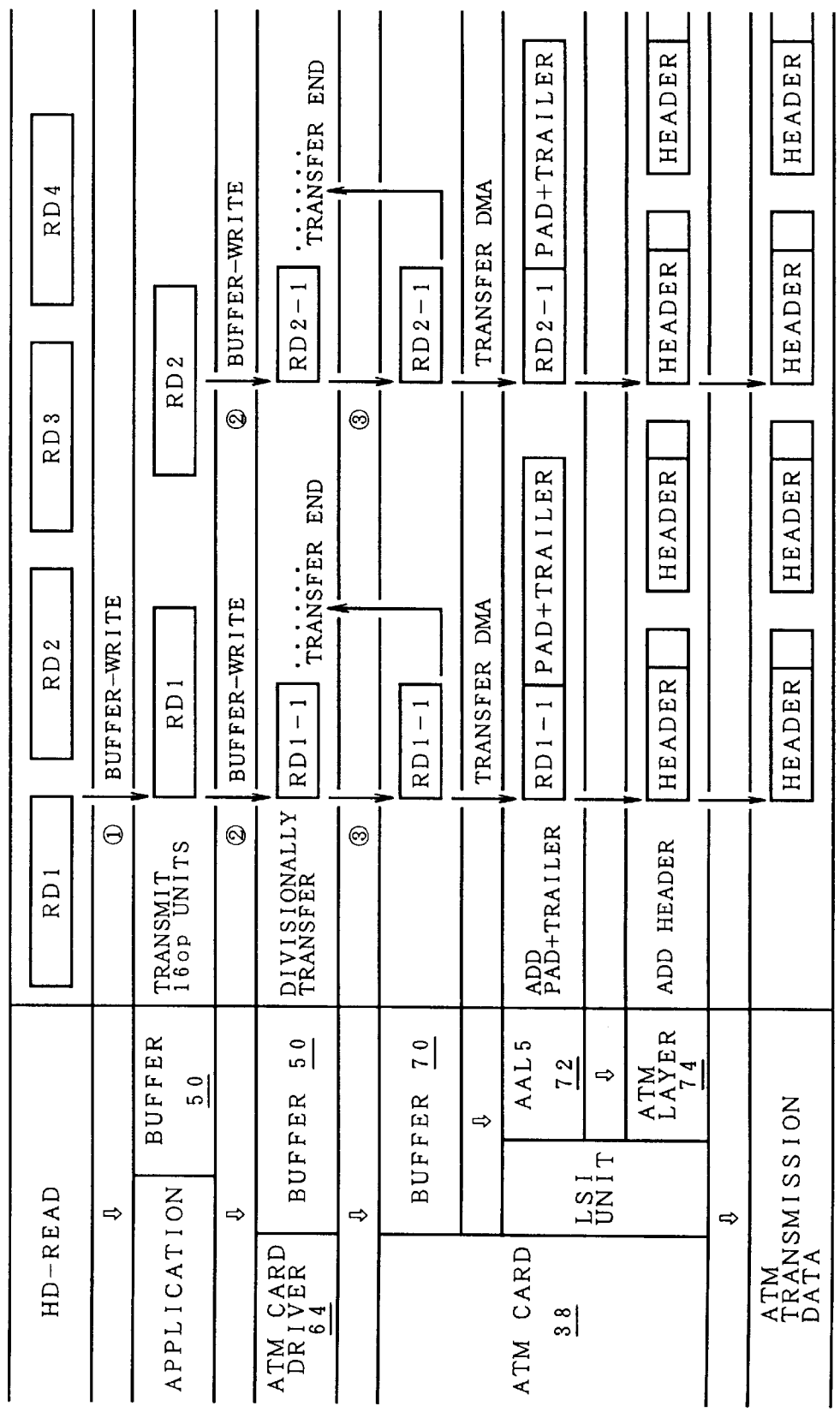
FIG. 16 is a time chart for a change in conversion of a data structure from a disk read to an ATM transmission data according to the invention.

FIG. 16 shows the details of the data reading operation from the hard disk 34 to the buffer memory 50 and the data transfer from the buffer memory 50 to the ATM card 38 in the video server 12 of the invention. First, for the buffer memory 50 of the processor module 36 from the hard disk, assuming that one frame of MPEG2-TS is set to read data RD1, RD2, RD3, . . . , a buffer·write such that the read data RD1 to RD5 of five units are written into the buffer memory 50 by one read access can be performed. As a buffer·write unit of the divisional data for the unit buffer for the divisional transmission which is used by the ATM card driver 64 from the buffer memory 50, the data as much as three units is stored. For example, one unit at a transmission rate of 1.5836 Mbps of MPEG1 is equal to 4.512 kbytes. The data of three units is stored into the buffer memory of the ATM card driver 64. In case of the transmission rate of 6.144 Mbps of MPEG2, one unit is equal to 18.048 kbytes and the data as much as three units is stored into the buffer memory of the ATM card driver 64. When the data is transferred from the ATM card driver 64 to the buffer memory 70 of the ATM card 38, since the buffer memory 70 has a memory capacity of, for example, 256 kbytes, the DMA transfer of the divisional data until the buffer memory 70 is filled with the data can be performed. That is, so long as there is a vacant capacity in the buffer memory 70, there is no limitation about a use amount of every transmission stream. There is no limitation by the transmission rate of the ATM card 38.

In FIG. 16, with respect to the data transmission from the ATM card driver 64 to the ATM card 38, although the transfer based on the transmitting instruction from the timer card 46 is omitted, actually, the DMA transfer from the buffer memory of the ATM card driver 64 to the buffer memory 70 of the ATM card 38 is executed each time there is a transmitting instruction of every 23 msec from the timer card 46. The data transmission by the cell division as ATM transmission data is executed simultaneously with the DMA transfer. A value of the data transfer in FIG. 17 can be properly determined as necessary in accordance with a capacity of the buffer memory in each portion.

Figure 17:
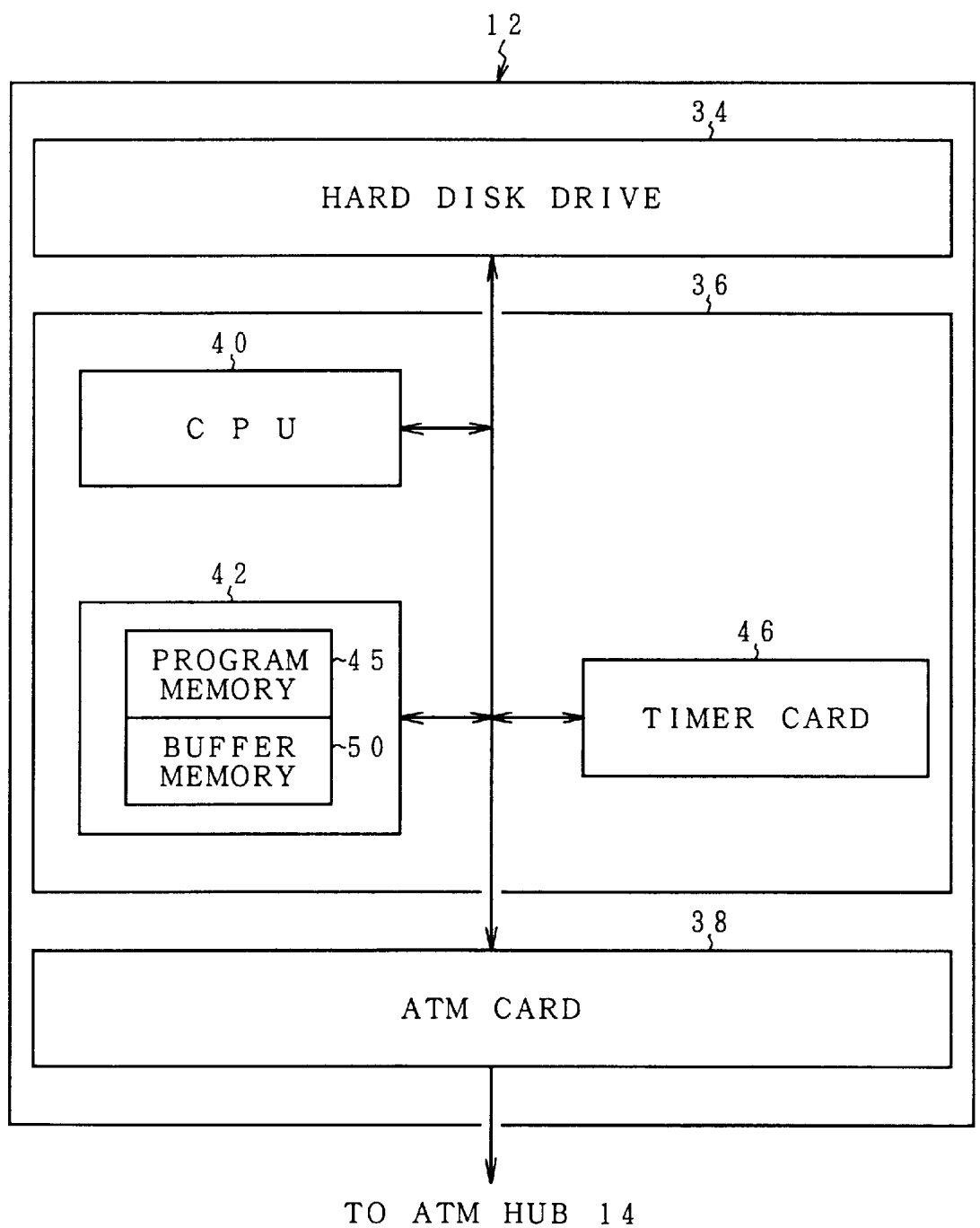
FIG. 17 is a block diagram of another embodiment of the processor module in FIG. 3.

FIG. 17 shows a form of another hardware construction of the video server 12 of the invention shown in FIG. 5. The embodiment is characterized in that the DMA controller 44 in FIG. 5 is not used but the data transfer from the hard disk 34 to the buffer memory 50 of the memory unit 42 and the data transfer from the buffer memory 50 to the ATM card 38 are executed by a program control of the CPU 40. That is, although all of the data transfers in the case where the read data read out from the hard disk 34 to the buffer memory 50 in the video server 12 of the invention is transferred to the ATM card driver 64 and ATM card 38 are the DMA transfer as shown in, for example, FIGS. 14 and 16, the data transfer by the reading and writing processes of the CPU 40 can be also executed.

In the embodiment of the invention, the transmission timing for converting into the constant bit rate has been formed by the hardware of the timer card 46, it is also possible to use a software timer such that a timer clock provided for the processor module 36 of the video server 12 is set to a reference and a time counting operation of the transmission interval (T) is performed by a software, and a transmitting instruction is generated.

Further, in the embodiment of the invention, as shown in FIG. 13, the user flag has been set for the data transmitting requests from a plurality of users and the multiple transmission of the data streams has been managed. However, as another embodiment, it is also possible to construct in a manner such that a timer flag is provided for the hardware and the timer flag is read and a multiple transmitting process is executed by the software.

In the above embodiment, with respect to both of FIGS. 14 and 15, the case of multiple transmitting the different data streams to a plurality of users has been shown and described as an example. However, in the video server system, there is a case where a transmitting request of the same stream is received from a plurality of users. In the case where the transmitting request of the same stream is received from a plurality of users as mentioned above, a multi-address multiple transmission such that when the read data which was read out from the hard disk 34 is stored into the buffer memory 50, the same data is written into a buffer region as a request destination of the same data stream and the same data of different transmission destinations is multiple transmitted can be also executed. For example, in FIG. 15, assuming that all of the data streams st#1 to st#n which were requested by the user indicate the same program, it is sufficient that, for example, the head read data RD1 which was read out from the hard disk 34 is also written as it is into the remaining read data RD12 to RD1n. As for such a process in which the same data as the read data RD11 is buffer-written into the read data RD12 to RD1n, it is sufficient that after one read data RD1 was read out from the hard disk 34, its copy data is transferred and written.

Further, although the above embodiment has been shown and described with regard to an example of the ATM network as a network of a variable bit rate as shown in FIG. 2, the invention can be also applied to an LAN network. Although the example in which the CATV network is used as a network of a constant bit rate has been described, an exclusive-use line network can be also used. Further, the invention is not limited by the numerical values shown in the above embodiment.

According to the invention as described above, the network card, for example, ATM card which is ordinarily used in the network interface of the server unit is used as it is and the data transmission of a variable bit rate can be easily converted to a constant bit rate by the transmitting instruction at every transmission interval by the timer unit. The costs of the system in case of transmitting the video data to the network of the constant bit rate as a transmission destination like a CATV network or an exclusive-use line network can be remarkably reduced. The performance of the system can be improved without needing a special network card of a high performance.

What is claimed is:

1. A multiple video server apparatus for providing video services from a video transmission center to a plurality of user terminals, comprising:
   a first network of a variable bit rate provided in said video transmission center;
   a second network of a constant bit rate connecting said first network and the plurality of user terminals; and
   a server unit, provided in said video transmission center, transmitting data to said first network at a transmission interval T where T=DL/n where "n" is the constant bit rate of said second network and "DL" is a transmission data amount to be transmitted to said first network, wherein said server unit includes:
      a data storage unit storing transmission data on a stream unit basis;
      a buffer memory temporarily storing the data transmitted from said data storage unit to said second network;
      a network interface transmitting the data in said buffer memory to said first network;
      a timer unit generating a transmission timing signal at every transmission interval T by frequency dividing a transmission clock of said first network, and
      a processor module that when a transmitting request of the data stream is received, reads the transmission data from said data storage unit and stores the transmission data into said buffer memory, and each time a transmission timing signal is obtained from said timer unit, reads the transmission data on a data amount DL unit basis from said buffer memory to said network interface and transmits the transmission data to said first network.

2. An apparatus according to claim 1, wherein said timer unit generates a transmission timing signal at the transmission interval T by a frequency dividing a clock signal generated from a general clock generating circuit.

3. An apparatus according to claim 1, wherein in the case where said second network has at least two different constant bit rates n1 and n2 in accordance with a kind of transmission data, said server unit transmits the data on a unit basis of the predetermined data amount DL every transmission intervals T1 and T2 which were set every constant bit rates n1 and n2.

4. An apparatus according to claim 3, wherein said timer unit has a programmable frequency dividing circuit, when a constant bit rate n1 is used, a frequency dividing ratio of said programmable frequency dividing circuit is set so that the transmission interval T1 is equal to $$T1=DL/n1$$

and when a constant bit rate n2 is used, the frequency dividing ratio of said programmable frequency dividing circuit is set so that the transmission interval T2 is equal to $$T2=DL/n2.$$

5. An apparatus according to claim 1, wherein when said second network has at least two different constant bit rates n1 and n2, in accordance with a kind of transmission data, said server unit transmits the data of different transmission data amounts DLI to DLm by using the same transmission interval T.

6. An apparatus according to claim 5, wherein said server unit obtains said transmission interval (T) so as to satisfy a relation $$T=DL1/n1=DL2/n2$$

and transmits the data at the same transmission interval (T) for the setting of the different constant bit rates n1 and n2 and the transmission data amounts DL1 and DL2 which are transmitted.

7. An apparatus according to claim 1, wherein when a plurality of data, stream transmitting requests are received, said processor module reads out a plurality of transmission data from said data storage unit and stores into said buffer memory, and each time a transmission timing signal is obtained from said timer unit, said processor module time-divisionally reads out each of the transmission data on a unit basis of said data amount DL from said buffer memory to said network interface and multiple transmits the transmission data to said first network.

8. An apparatus according to claim 7, wherein said processor module registers flag information indicative of the presence or absence of a transmitting request and a request stream name for every plurality of terminals as request destinations of the data transmission, and when the transmission timing signal is received from said timer unit, said processor module time-divisionally multiple transmits the data streams which were requested by a reference to said flag information.

9. An apparatus according to claim 8, wherein where there are a plurality of same request stream names by the reference to said flag information, said processor module time-divisionally multiple transmits the same data.

10. An apparatus according to claim 8, wherein where there are a plurality of same request stream names by the reference to said flag information, when the transmission data is read out from said data storage unit, said processor module writes a plurality of same data into said buffer memory separately on a request destination unit basis and time-divisionally multiple transmits the same data in said buffer memory.

11. An apparatus according to claim 1, wherein said processor module has a CPU which operates by a program control and, further, has a direct memory access controller for executing a data reading control from said data storage unit to said buffer memory and a data transmission control from said buffer memory to said network interface.

12. An apparatus according to claim 1, wherein said processor module has a CPU which operates by a program control and said CPU executes a data reading control from said data storage unit to said buffer memory and a data transmission control from said buffer memory to said network interface by a read/write command.

13. An apparatus according to claim 1, wherein said data storage unit is a hard disk.

14. An apparatus according to claim 1, wherein said timer unit is a software timer comprising a program which counts fundamental clocks and generates the transmission timing signal when the count value coincides with a value obtained by expressing said transmission interval T by the number of fundamental clocks.

15. An apparatus according to claim 1, wherein said first network of the variable bit rate is an ATM network, said second network of the constant bit rate is a CATV network, and said server unit transmits the data to said ATM network at a transmission interval adapted to the constant bit rate of said CATV network.

16. An apparatus according to claim 15, wherein said server unit comprises:

a hard disk for storing the transmission data on a stream unit basis;

a buffer memory temporarily storing the data transmitted from said hard disk to said ATM network;

an ATM card transmitting the data in said buffer memory to said ATM network;

a timer unit generating the transmission timing signal at every said transmission interval T by a frequency division of a transmission clock of said ATM network; and a processor module controlling in a manner such that when a transmitting request of a data stream is received, the transmission data is read out from the data storage unit and stored into said buffer memory, and each time the transmission timing signal is obtained from said timer unit, the transmission data is read out from said buffer memory to said ATM card on a unit basis of said data amount DL and is transmitted to said ATM network.

17. An apparatus according to claim 15, wherein moving image data in a MPEG1 or MPEG2 format has been stored in said hard disk, and where the constant bit rate of said CATV network is set to 1.536 Mbps for MPEG1 and 6.144 Mbps for MPEG2, a transmission data amount which is transmitted at a time is set to 1 4.512 kbytes for MPEG1 and 18.047 kbytes for MPEG2, said transmission interval T is set to T=23.5 msec.

18. An apparatus according to claim 17, wherein said timer card frequency divides a clock synchronized with a peak rate of 156 Mbps of said ATM network, thereby producing the transmission timing signal.

* * * * *